(12) United States Patent
Milyutin et al.

(10) Patent No.: US 9,891,325 B2
(45) Date of Patent: Feb. 13, 2018

(54) DETECTION AND CORRECTION OF ANOMALOUS MEASUREMENTS AND AMBIGUITY RESOLUTION IN A GLOBAL NAVIGATION SATELLITE SYSTEM RECEIVER

(71) Applicant: Topcon Positioning Systems, Inc., Livermore, CA (US)

(72) Inventors: Daniel Milyutin, Moscow (RU); Andrey Plenkin, Kashira (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 765 days.

(21) Appl. No.: 14/273,120

(22) Filed: May 8, 2014

(65) Prior Publication Data
US 2014/0240172 A1 Aug. 28, 2014

Related U.S. Application Data

(62) Division of application No. 12/943,102, filed on Nov. 10, 2000, now Pat. No. 8,760,343.

(Continued)

(51) Int. Cl.
*G01S 19/43* (2010.01)
*G01S 19/20* (2010.01)
*G01S 19/44* (2010.01)

(52) U.S. Cl.
CPC .............. *G01S 19/43* (2013.01); *G01S 19/20* (2013.01); *G01S 19/44* (2013.01)

(58) Field of Classification Search
CPC .......... G01S 19/20; G01S 19/30; G01S 19/43; G01S 19/44
See application file for complete search history.

(56) References Cited

U.S. PATENT DOCUMENTS 5,825,326 A 10/1998 Semler et al.
5,914,685 A * 6/1999 Kozlov .................. G01S 19/44
342/357.26

(Continued)

FOREIGN PATENT DOCUMENTS

EP 1 835 299 9/2007
JP 2003-185728 A 7/2003

(Continued)

OTHER PUBLICATIONS

B.W. Parkinson et al., J.J. Global Positioning System: Theory and Applications, vol. 1; Progress in Astronautics and Aeronautics, vol. 163, American Institute of Aeronautics and Astronautics, Inc., p. 10-11, 1996.*

(Continued)

*Primary Examiner* — Bernarr E Gregory
*Assistant Examiner* — Fred H Mull
(74) *Attorney, Agent, or Firm* — Chiesa Shahinian & Giantomasi PC

(57) ABSTRACT

A global navigation system includes a first navigation receiver located in a rover and a second navigation receiver located in a base station. Single differences of measurements of satellite signals received at the two receivers are calculated and compared to single differences derived from an observation model. Anomalous measurements are detected and removed prior to performing computations for determining the output position of the rover and resolving integer ambiguities. Detection criteria are based on the residuals between the calculated and the derived single differences. For resolving integer ambiguities, computations based on Cholesky information Kalman filters and Householder transformations are advantageously applied. Changes in the state of the satellite constellation from one epoch to another are included in the computations.

27 Claims, 9 Drawing Sheets

Related U.S. Application Data

(60) Provisional application No. 61/261,772, filed on Nov. 17, 2009.

(56) References Cited

U.S. PATENT DOCUMENTS

| | | | |
|---|---|---|---|
| 5,926,132 A * | 7/1999 | Brenner | G01S 19/20 |
| | | | 342/357.29 |
| 6,278,945 B1 | 8/2001 | Lin | |
| 6,469,663 B1 | 10/2002 | Whitehead et al. | |
| 6,861,979 B1 | 3/2005 | Zhodzishsky et al. | |
| 6,950,059 B2 | 9/2005 | Rapoport et al. | |
| 7,003,065 B2 | 2/2006 | Homol et al. | |
| 7,053,826 B1 * | 5/2006 | McBurney | G01S 19/252 |
| | | | 342/357.64 |
| 7,176,764 B1 | 2/2007 | Wang et al. | |
| 2002/0021241 A1 | 2/2002 | Zhodzishsky et al. | |
| 2002/0097181 A1 * | 7/2002 | Chou | G01S 19/30 |
| | | | 342/357.29 |
| 2002/0198656 A1 | 12/2002 | Ford et al. | |
| 2004/0145518 A1 * | 7/2004 | Toda | G01S 19/55 |
| | | | 342/357.27 |
| 2005/0001763 A1 | 1/2005 | Han et al. | |
| 2006/0273954 A1 | 7/2006 | Diggelen | |
| 2007/0052583 A1 * | 3/2007 | Zhodzishsky | G01C 21/00 |
| | | | 342/357.24 |
| 2007/0120733 A1 | 5/2007 | Vollath et al. | |
| 2009/0128407 A1 | 5/2009 | Xie et al. | |
| 2011/0187590 A1 * | 8/2011 | Leandro | G01S 19/44 |
| | | | 342/357.27 |

FOREIGN PATENT DOCUMENTS

| | | | | |
|---|---|---|---|---|
| JP | 2007-071844 A | | 3/2007 | |
| JP | 2007071869 A | | 3/2007 | |
| WO | WO 99/23505 A1 * | | 5/1999 | G01S 19/55 |

OTHER PUBLICATIONS

J. Wood, Non-linear least squares methods for parameter estimation, with applications in reactor physics, Journal of the Institution of Nuclear Engineers 14.4, abstract, Jul. 1973.*

J.T. Wu et al., Effects of antenna orientation on GPS carrier phase, Manuscripta Geodaetica, Springer-Verlag, vol. 18, p. 91-98, 1993.*

S. Gratton et al., Approximate Gauss-Newton methods for nonlinear least squares problems, The University of Reading Department of Mathematics Numerical Analysis Report, p. 1-25, Sep. 2004.*

Notice of Reasons for Refusal dated Sep. 30, 2014, in connection with Japanese Patent Application No. 2014-169090, 4 pgs.

Takashi Yahagi, "Kalman Filter and Adaptive Signal Processing," Corona Publishing Co., Ltd., 1st Edition, Dec. 28, 2005, 26 pgs.

Han et al., "A New Method for Constructing Multi-Satellite Ambiguity Combinations for Improved Ambiguity Resolution", Proceedings of ION GPS-95, 8th International Technical Meeting of The Satellite Division of The Institute of Navigation, pp. 1145-1153, 1195.

Cholesky factorization. (2008). In the Penguin Dictionary of Mathematics. Retrieved from http://www.credoreference.com/entry/penguinmath/cholesky_factorization.

Zhodziskshy, et al., "Real-Time Kinematic (RTK) Processing for Dual-Frequency GPS/GLONASS", Proceedings of the 11th International Technical Meeting of the Satellite Division of Navigation, USA, Sep. 15, 1998.

PCT International Search Report corresponding to PCT Application PCT/IB2010/002883 dated Nov. 10, 2010 (7 pages).

Written Opinion of the International Searching Authority corresponding to PCT Application PCT/IB2010/002883 dated Nov. 10, 2010 (11 pages).

X-W. Chang, X. Yang, and T. Zhou, "MLAMBDA: A modified LAMBDA method for integer least-squares estimation", Journal of Geodesy, vol. 79, Issue 9, pp. 552-565, Dec. 2005.

Notice of Reasons of Rejection for Rejection dated Jun. 3, 2014, in connection with corresponding Japanese patent application No. 2012-538426, 11 pgs.

* cited by examiner $$[\mathbf{S}^x|\mathbf{s}^x] = \begin{bmatrix} S_{[\vec{r}],[\vec{r}]} & 0 & 0 & \cdots & 0 & 0 & S_{[\vec{r}]} \\ S_{[\vec{r}],[N^1]} & S_{[N^1],[N^1]} & 0 & \cdots & 0 & 0 & S_{[N^1]} \\ S_{[\vec{r}],[N^2]} & S_{[N^1],[N^2]} & S_{[N^2],[N^2]} & \cdots & 0 & 0 & S_{[N^2]} \\ \vdots & \vdots & \vdots & \ddots & \vdots & \vdots & \vdots \\ S_{[\vec{r}],[N^{NF-1}]} & S_{[N^1],[N^{NF-1}]} & S_{[N^2],[N^{NF-1}]} & \cdots & S_{[N^{NF-1}],[N^{NF-1}]} & 0 & S_{[N^{NF-1}]} \\ S_{[\vec{r}],[N^{NF}]} & S_{[N^1],[N^{NF}]} & S_{[N^2],[N^{NF}]} & \cdots & S_{[N^{NF-1}],[N^{NF}]} & S_{[N^{NF}],[N^{NF}]} & S_{[N^{NF}]} \end{bmatrix}$$

$$[\tilde{\mathbf{S}}^x | \tilde{\mathbf{s}}^x] = \begin{bmatrix} \beta \cdot S_{[\vec{F}],[\vec{F}]} & \beta \cdot S_{[\vec{F}],[N^1]} & \beta \cdot S_{[\vec{F}],[N^2]} & \cdots & \beta \cdot S_{[\vec{F}],[N^{NF-1}]} & \beta \cdot S_{[\vec{F}],[N^{NF}]} & \beta \cdot s_{[\vec{F}]} \\ 0 & \alpha \cdot S_{[N^1],[N^1]} & \alpha \cdot S_{[N^1],[N^2]} & \cdots & \alpha \cdot S_{[N^1],[N^{NF-1}]} & \alpha \cdot S_{[N^1],[N^{NF}]} & \alpha \cdot s_{[N^1]} \\ 0 & 0 & \alpha \cdot S_{[N^2],[N^2]} & \cdots & \alpha \cdot S_{[N^2],[N^{NF-1}]} & \alpha \cdot S_{[N^2],[N^{NF}]} & \alpha \cdot s_{[N^2]} \\ \vdots & \vdots & \vdots & \ddots & \vdots & \vdots & \vdots \\ 0 & 0 & 0 & \cdots & \alpha \cdot S_{[N^{NF-1}],[N^{NF-1}]} & \alpha \cdot S_{[N^{NF-1}],[N^{NF}]} & \alpha \cdot s_{[N^{NF-1}]} \\ 0 & 0 & 0 & \cdots & 0 & \alpha \cdot S_{[N^{NF}],[N^{NF}]} & \alpha \cdot s_{[N^{NF}]} \end{bmatrix}$$

CI-LSM.Update(&$\mathbf{S}$,&$\mathbf{s}$,&$\overline{\mathbf{H}}$,&$\overline{\mathbf{y}}$)
  (flops: $(2m+2)n^2 + (4m+7)n$)
for($j := [1:n]$)
{
  nH2 := $\overline{\mathbf{H}}$.dotCol($j,j$);                                    (flops: $2m-1$)
  if(nH=0) continue;
  $a := -\text{sign}_+([\mathbf{S}]_{j,j}) \cdot \sqrt{[\mathbf{S}]_{j,j}^2 + \text{nH2}}$, $h := [\mathbf{S}]_{j,j} - a$, $b := a \cdot h$;   (flops: 6)
  for($i := [j+1:n]$)
         (flops: $4(m+1)(n-j)$)
  {
    $t := (\overline{\mathbf{H}}.\text{dotCol}(i,j) + [\mathbf{S}]_{j,i} \cdot h) / b$;          (flops: $2m+2$)
    $\overline{\mathbf{H}}$.saxpyCol($i, t, j$);                                (flops: $2m$)
    $[\mathbf{S}]_{j,i} := [\mathbf{S}]_{j,i} + h \cdot t$;                          (flops: 2)
  };
  $t := (\text{dotCol}(\overline{\mathbf{H}}_{[:],j}, \overline{\mathbf{y}}) + s_j \cdot h) / b$;          (flops: $2m+2$)
  $\overline{\mathbf{y}}$.saxpyCol($t, \overline{\mathbf{H}}_{[:],j}$);                              (flops: $2m$)
  $\overline{\mathbf{H}}_{[:],j} := 0_{m \times 1}$;
  $s_j := s_j + h \cdot t$; $[\mathbf{S}]_{j,j} := a$;                          (flops: 2)
};

$$\begin{bmatrix} S_{[\vec{r}],[\vec{r}]} & S_{[\vec{r}],[N^1]}A^1 & S_{[\vec{r}],[N^2]}A^2 & \cdots & S_{[\vec{r}],[N^{NF-1}]}A^{NF-1} & S_{[\vec{r}],[N^{NF}]}A^{NF} \\ 0 & S_{[N^1],[N^1]}A^1 & S_{[N^1],[N^2]}A^2 & \cdots & S_{[N^1],[N^{NF-1}]}A^{NF-1} & S_{[N^1],[N^{NF}]}A^{NF} \\ 0 & 0 & S_{[N^2],[N^2]}A^2 & \cdots & S_{[N^2],[N^{NF-1}]}A^{NF-1} & S_{[N^2],[N^{NF}]}A^{NF} \\ \vdots & \vdots & \vdots & \ddots & \vdots & \vdots \\ 0 & 0 & 0 & \cdots & S_{[N^{NF-1}],[N^{NF-1}]}A^{NF-1} & S_{[N^{NF-1}],[N^{NF}]}A^{NF} \\ 0 & 0 & 0 & \cdots & 0 & S_{[N^{NF}],[N^{NF}]}A^{NF} \end{bmatrix}$$

FormFactors($\mathbf{w}, |\mathbf{w}|^2_{[1:n]}, \&\mathbf{a}, \&\alpha, i, \&n$)
    (flops: $(11+1_{\sqrt{}})\cdot(n-i+1), n=n_{out}$)
{
  nw2:=$|\mathbf{w}|^2_{[1:n]}$;
  if(nw2 = 0){$i := i-1$; goto Exit;};
  $i := i$; nw:=$\sqrt{nw2}$; $f := 1/nw$;    (flops: $1+1_{\sqrt{}}$)
NextStep:
  $q := f \cdot [\mathbf{w}]$; nw2:=nw2 $-([\mathbf{w}]_i)^2$; nw:=$\sqrt{nw2}$;  (flops: $3+1_{\sqrt{}}$)
  $a := f \cdot nw$; $a_i := a$;    (flops: 1)
  if($a = 0$){$d := 1$; goto Exit;};
  $\alpha_i := -q \cdot f / a$; $f := 1./nw$;    (flops: 7)
  if($i = n-1$) {$a_n := 0$; return;};
  $i := i+1$; goto NextStep;
Exit:
  $n := i$;
};    (E76)

FIG. 7

$$\text{Multiply}(\&z, \underline{n}_z, \mathbf{a}, \boldsymbol{\alpha}, \mathbf{w}, \underline{i}, n)$$
$$\text{flops: } \begin{cases} 5(n-\underline{i})+1, & n > \underline{i} \\ 1, & n = \underline{i} \end{cases}$$

{
  $n := \min(n, \underline{n}_z)$;
  $\text{if}(n > 1) \ q := [\mathbf{w}]_n \cdot [\mathbf{z}]_n$;       (flops: 1)
  $[\mathbf{z}]_n := [\mathbf{a}]_n \cdot [\mathbf{z}]_n$                   (flops: 1)
  $\text{for}(i := n-1; i > \underline{i}; i := i-1)$
  {
    $d := [\mathbf{w}]_i \cdot [\mathbf{z}]_i, \ [\mathbf{z}]_i := [\mathbf{a}]_i \cdot [\mathbf{z}]_i + [\boldsymbol{\alpha}]_i \cdot q, \ q := q + d$;   (flops: 5)
  };
  $\text{if}(n > \underline{i})$
    $\{ [\mathbf{z}]_{\underline{i}} := [\mathbf{a}]_{\underline{i}} \cdot [\mathbf{z}]_{\underline{i}} + [\boldsymbol{\alpha}]_{\underline{i}} \cdot q; \}$      (flops: 3)
};

DETECTION AND CORRECTION OF ANOMALOUS MEASUREMENTS AND AMBIGUITY RESOLUTION IN A GLOBAL NAVIGATION SATELLITE SYSTEM RECEIVER

This application is a divisional of U.S. patent application Ser. No. 12/943,102, filed Nov. 10, 2010, which claims the benefit of U.S. Provisional Application No. 61/261,772 filed Nov. 17, 2009, each of which is incorporated herein by reference.

BACKGROUND OF THE INVENTION

The present invention relates generally to global navigation satellite systems, and more particularly to detection and correction of anomalous measurements and ambiguity estimation in a navigation receiver.

Global navigation satellite systems (GNSSs) can determine locations with high accuracy. Currently deployed global navigation satellite systems are the United States Global Positioning System (GPS) and the Russian GLONASS. Other global navigation satellite systems, such as the European GALILEO system, are under development. In a GNSS, a navigation receiver receives and processes radio signals transmitted by satellites located within a line-of-sight distance of the navigation receiver. The satellite signals comprise carrier signals modulated by pseudo-random binary codes. The navigation receiver measures the time delays of the received signals relative to a local reference clock or oscillator. Code measurements enable the navigation receiver to determine the pseudo-ranges between the navigation receiver and the satellites. The pseudo-ranges differ from the actual ranges (distances) between the navigation receiver and the satellites due to various error sources and due to variations in the time scales of the satellites and the navigation receiver. If signals are received from a sufficiently large number of satellites, then the measured pseudo-ranges can be processed to determine the code coordinates and coordinate time scales at the navigation receiver. This operational mode is referred to as a stand-alone mode, since the measurements are determined by a single navigation receiver. A stand-alone system typically provides meter-level accuracy.

To improve the accuracy, precision, stability, and reliability of measurements, differential navigation (DN) systems have been developed. In a DN system, the position of a user is determined relative to a base station (also referred to as a base) whose coordinates are precisely known. The base contains a navigation receiver that receives satellite signals. The user, whose position is to be determined, can be stationary or mobile and is often referred to as a rover. The rover also contains a navigation receiver that receives satellite signals. Signal measurements processed at the base are transmitted to the rover via a communications link. The communications link, for example, can be provided over a cable or optical fiber. To accommodate a mobile rover, the communications link is often a wireless link.

The rover processes the measurements received from the base, along with measurements taken with its own navigation receiver, to improve the accuracy of determining its position. Accuracy is improved in the differential navigation mode because errors incurred by the navigation receiver at the rover and by the navigation receiver at the base are highly correlated. Since the coordinates of the base are accurately known, measurements from the base can be used to compensate for the errors at the rover. A differential global positioning system (DGPS) computes locations based on pseudo-ranges only.

The location determination accuracy of a differential navigation system can be further improved by supplementing the code pseudo-range measurements with measurements of the phases of the satellite carrier signals. If the carrier phases of the signals transmitted by the same satellite are measured by both the navigation receiver at the base and the navigation receiver at the rover, processing the two sets of carrier phase measurements can yield a location determination accuracy to within several percent of the carrier's wavelength. A differential navigation system that computes locations based on real-time carrier signals, in addition to the code pseudo-ranges, is often referred to as a real-time kinematic (RTK) system. Processing carrier phase measurements to determine coordinates includes the step of ambiguity resolution; that is, determining the integer number of cycles in the carrier signal received by a navigation receiver from an individual satellite.

In many instances, a navigation receiver (in particular, the navigation receiver at the rover) operates in a complex environment in which various external influences cause measurement errors. For example, external signals can interfere with the satellite signals, and structures and terrain can result in multipath errors. Errors can be classified into two broad categories: normal errors and abnormal errors. Normal errors are normally-distributed white noise errors that can be compensated for during calculation of location coordinates. Abnormal errors are large systematic errors that can prevent the system from calculating an accurate location. In some instances, abnormal errors are caused by spikes of intrinsic noise. More often, they result from environmental conditions. For example, strong reflected signals that interfere with the direct satellite signal can cause an abnormal error. Similarly, extreme radio interference can also result in abnormal errors.

Partial or complete shading of the navigation receiver can result in errors due to radio wave diffraction. If the shading is partial and minor, the measurement error can be minimal. If a satellite is completely shaded (that is, blocked), however, only the multipath signal remains. As a result, tracking in the channel is interrupted, and the measured phase is lost, resulting in an abnormal error. Dynamic effects on the navigation receiver (for example, specific motions of the rover) can also cause abnormal errors. Impulse accelerations impact both the receiving antenna and the quartz crystal of the local reference oscillator, resulting in drift of the intermediate carrier frequency and measured phase.

One specific type of abnormal error is a phase-lock loop (PLL) cycle slip, which is a cycle slip in the PLL circuits that track the satellite carrier signal. After a cycle slip occurs, the PLL circuit transitions to a new point of steady balance, after which it continues tracking the satellite carrier signal. If a cycle slip occurs during signal tracking, an abnormal error equal to several integer number of semi-cycles (half-cycles) is introduced into the carrier phase measurements. If a cycle slip occurs after signal lock, an abnormal error equal to several integer number of cycles is introduced into the carrier phase measurements.

Calculating coordinates from received satellite signals entails the calculation of complex mathematical algorithms. These algorithms are computationally intense, often utilizing high processor and memory capacity. What are needed are methods and apparatus for detection and correction, or elimination, of abnormal measurements prior to execution of complex algorithms.

BRIEF SUMMARY OF THE INVENTION

A global navigation system includes a first navigation receiver located in a rover and a second navigation receiver located in a base station. A first plurality of measurements based on a first plurality of carrier signals received by the first navigation receiver from a plurality of global navigation satellites is received. A second plurality of measurements based on a second plurality of carrier signals received by the second navigation receiver from the plurality of global navigation satellites is received. Each carrier signal in the second plurality of carrier signals corresponds to a carrier signal in the first plurality of carrier signals, and each measurement in the second plurality of measurements corresponds to a measurement in the first plurality of measurements.

In an embodiment, anomalous measurements are detected and eliminated prior to performing computations for determining the output position of the rover. To detect anomalous measurements, a first plurality of single differences based on the first plurality of measurements and the second plurality of measurements are calculated. A state vector based on the first plurality of single differences is determined. A second plurality of single differences based on an observation model is calculated. A plurality of residuals based on the first plurality of single differences and the second plurality of single differences is calculated. Whether the first plurality of single differences and the second plurality of single differences are consistent with the observation model is determined. When the first plurality of single differences and the second plurality of single differences are not consistent, anomalous measurements are detected and eliminated.

In an embodiment, integer ambiguities are resolved. Single differences of pseudo-ranges and carrier phases are first calculated. The single differences are linearized, and an observation vector and matrix are calculated. If the position of the rover is known, then an inverse operation is performed to determine an estimate of the integer ambiguities vector. If the position of the rover is not known, then the ambiguities are filtered and float ambiguities are estimated. An integer ambiguities vector candidate is determined and evaluated against fix criteria. If the fix criteria are met, then an estimate of the integer ambiguities vector is generated.

In an embodiment, anomalous measurements are detected and removed prior to filtering ambiguities. Fast search procedures are used in the calculations for detecting anomalies. The calculations for resolving integer ambiguities involve generating a Cholesky information Kalman filter and performing a Householder transformation on the Cholesky information Kalman filter.

These and other advantages of the invention will be apparent to those of ordinary skill in the art by reference to the following detailed description and the accompanying drawings.

BRIEF DESCRIPTION OF THE DRAWINGS

FIG. 3 shows an expression for initial Cholesky information coordinates;

FIG. 4 shows an expression for Cholesky information coordinates at a later epoch;

FIG. 5 shows pseudo-code for an algorithm for updating a state vector;

FIG. 6 shows an expression for a matrix used in resolving integer ambiguities when a reference satellite changes;

FIG. 7 and FIG. 8 show pseudo-code for algorithms used in resolving integer ambiguities when a satellite sets.

DETAILED DESCRIPTION

Figure 1:
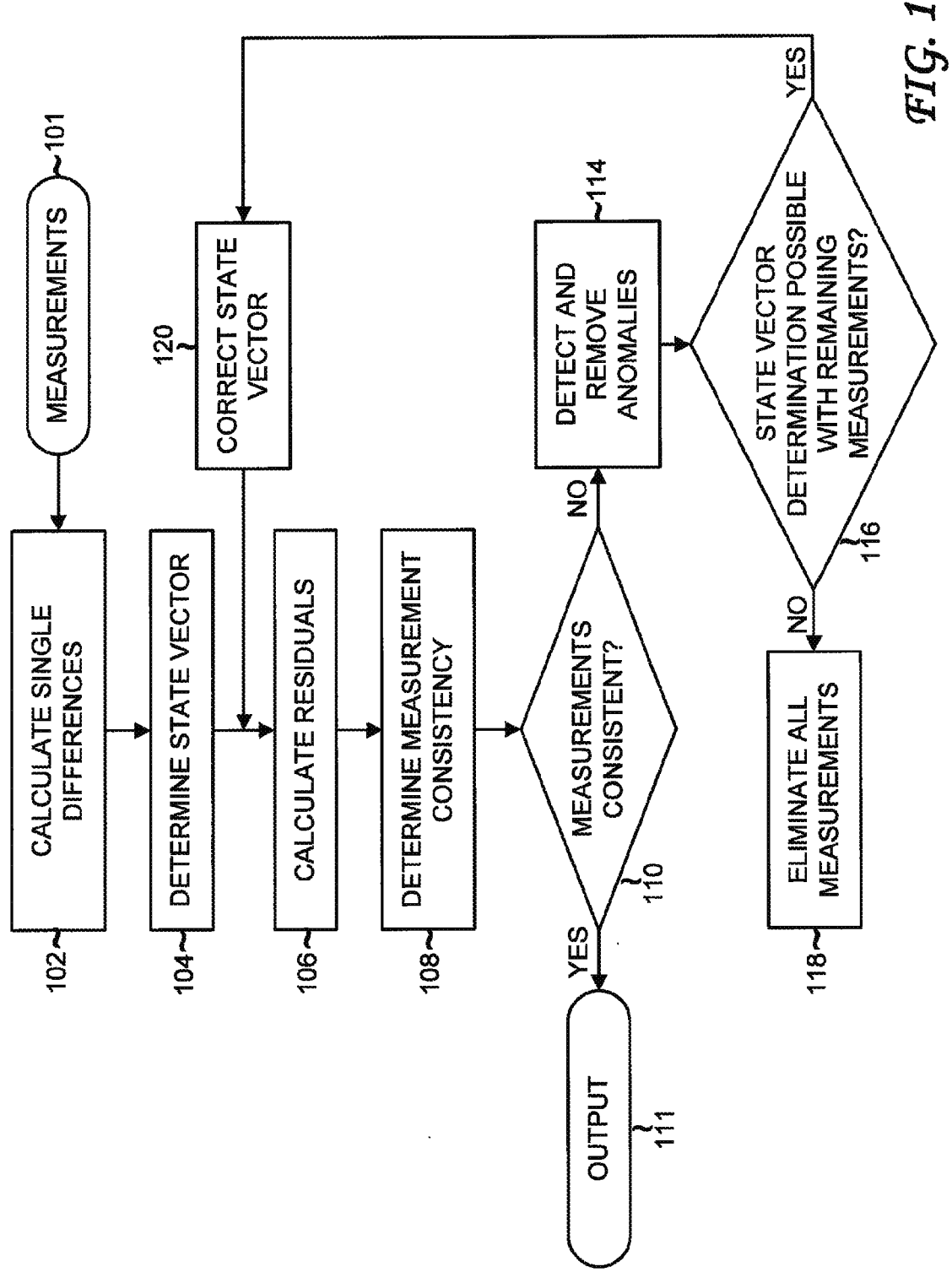
FIG. 1 shows a flowchart of a method for detecting and correcting anomalous measurements.

The navigation measurements of interest can be viewed as solutions for the unknown components of a state vector of a system. Components of the state vector include: position vector of the rover; velocity vector of the rover (if required); clock errors in the local reference oscillators in the navigation receivers at the base and at the rover; and the n integer ambiguities of the phase measurements of the carrier signals received by the navigation receivers at the base and the rover. The number n is discussed below. To simplify the terminology, a navigation receiver is also referred to herein as a receiver.

In principle, time is measured with respect to a common system clock. In practice, each satellite transmitter and each receiver has its own local reference clock. The local reference clock in a receiver is typically a quartz oscillator, which can have variations in frequency and phase. These variations result in clock errors. There are also clock errors corresponding to the local reference clock in a satellite transmitter. The clock in a satellite transmitter is typically more precise and stable than the clock in a receiver; however, for precise measurements, clock errors in the satellite transmitter are also taken into account. The difference in time determined by a local clock in a receiver or satellite and the time determined by the common system clock is referred to as the clock offset. In a global navigation satellite system (GNSS), a discrete time scale is often used. The time instants referenced to timing signals transmitted by a satellite are referred to as epochs. Other time instants are referenced to digital processing circuits in receivers.

The carrier phase of a carrier signal is the sum of an integer number of cycles and a fractional cycle. The fractional cycle can be directly measured, but the integer number of cycles is initially indeterminate and, therefore, is often referred to as the integer ambiguity. The process of determining the integer number of cycles is referred to as ambiguity resolution. Hereinafter, carrier phase refers to the ambiguous carrier phase initially determined by the receiver, and unambiguous phase refers to the unambiguous carrier phase after ambiguity resolution.

For a single-frequency receiver, the number n of integer ambiguities that needs to be resolved is equal to the number of satellites whose signals are being received and processed. Each satellite in a global navigation satellite system, however, transmits signals on more than one carrier frequency. For example, a GPS satellite can transmit signals on a carrier in the $L_1$ frequency band and on a carrier in the $L_2$ frequency band. If the receiver is a dual-frequency unit, then the number n is equal to twice the number of satellites whose signals are being received and processed. That is, the number n is equal to the number of satellite channels being received and processed, where a satellite channel is specified by the identity of the satellite and the carrier frequency. Receiving signals on two carrier frequencies allows corrections for ionospheric delays; these corrections simplify ambiguity resolution.

A carrier signal transmitted by a satellite follows one direct propagation path to the rover receiver and a second direct propagation path to the base receiver. Herein, a carrier signal received by the rover receiver corresponds to a carrier signal received by the base receiver when both received carrier signals correspond to the same carrier signal transmitted by a satellite. The state vector is calculated from an observation vector, whose components include two sets of navigation parameters. One set is determined from data measured by the base receiver; and a corresponding set is determined from data measured by the rover receiver. Each set of navigation parameters includes the pseudo-range of each satellite to the receiver and the carrier phase of each satellite carrier signal. The pseudo-range between a satellite and a receiver is obtained by measuring the time delay of a code modulation signal transmitted by the satellite and received by the receiver. The code modulation signal is tracked by a delay-lock loop (DLL) circuit in a satellite tracking channel. The carrier phase of a carrier signal is tracked by a phase-lock-loop (PLL) in the satellite tracking channel. The navigation parameters are determined at discrete instants of time, and an observation vector is generated as the collection of the navigation parameters over a time range.

The relationship between the state vector and the observation vector is defined by a well-known system of navigation equations. Given an observation vector, the system of equations can be solved to find the state vector if the number of equations equals or exceeds the number of unknowns in the state vector. Conventional statistical methods can be used to solve the system of equations; for example, the least squares method (LSM), the dynamic Kalman filtering method, and various modifications and combinations of LSM and Kalman.

Practical implementations of these methods in digital form can vary widely. In implementing a method in a processor, there is typically a compromise between the accuracy of the results, speed of calculation, and load on the processor. One general scheme includes the following steps. A set of navigation parameters determined by the base receiver is transmitted to the rover. A corresponding set of navigation parameters is determined by the rover receiver. For each satellite channel at specific instants of time, the single difference between the pseudo-range measured at the base receiver and the pseudo-range measured at the rover receiver is determined, and the single difference between the carrier phase measured at the base receiver and the carrier phase measured at the rover receiver is determined.

Measurements at the base receiver and at the rover receiver contain errors which are strongly correlated. For example, clock errors in a satellite transmitter are common to the signals received by both the base receiver and the rover receiver. As another example, if the base and the rover are sufficiently close together, errors caused by signal propagation through the atmosphere are common to the signals received by both the base receiver and the rover receiver. Single differences compensate for strongly correlated errors; that is, the strongly correlated errors are substantially cancelled.

The residuals of the single differences are then determined by subtracting calculated values from the measured values. Calculated values are based on an observation model. The processing of residuals allows the initial non-linear system of navigation equations to be linearized (sometimes several iterations are necessary). Well-known mathematical techniques for solving systems of linear equations can then be applied. For example, in one embodiment, the single-difference measurements are first processed by the Gauss-Newton algorithm, and initial residuals are generated. The initial residuals are then processed by multiple iterations of the Gauss-Newton algorithm until convergence is reached. The final solution generates final residuals. Detection and elimination of anomalies are based on the final residuals. Algorithms other than the Gauss-Newton method can be used. For example, the Newton method can be used; however, this requires double derivatives of residuals. Methods for linearization during iterations include the Zeidel method and the Jacobi method. Also, calculations include searching for minima of functions, and methods of optimization can be used instead (such as the Rosenbrock method, simplex method, quasi-gradient method, and quasi-Newton method).

The components of the state vector, including the ambiguities, are determined. The calculated values of the ambiguities, however, are not necessarily processed as integer numbers; they are often processed as floating point numbers, referred to as float (or floating) ambiguities. An ambiguity resolution process rounds off the set of floating point values to a set of integer values. The true values of the residuals are then calculated from the set of integer values, and the system of equations is solved again with these integer values. The coordinates of the rover and the corrections to the clock offset in the rover are then determined. To simplify the terminology, calculating corrections to the clock offset is also referred to as calculating the clock offset.

Calculating coordinates and clock offset from received satellite signals entails the calculation of complex mathematical algorithms. These algorithms are computationally intensive, often utilizing high processor and memory capacity. Detection and correction, or elimination, of abnormal measurements prior to execution of complex algorithms are advantageous for reducing processor and memory utilization. Furthermore, the time for calculating coordinates is reduced, and the accuracy of the coordinates is increased.

Abnormal measurements are also referred to herein as anomalous measurements. Anomalous measurements impact various operations, such as the calculation of positions and the resolution of ambiguities. When there is an anomalous measurement in the positioning operation or in the ambiguity resolution operation, for example, the state vector will be distorted. Anomalous measurements need to be corrected or eliminated first. Since optimal position calculation and ambiguity resolution over the whole set of equations consume considerable computational resources, it is advantageous to correct or eliminate the anomalous measurements prior to the execution of complex algorithms.

In embodiments of the invention, anomalous measurements are detected by an anomaly detector that determines the consistency of measurements with an observation model. Methods for fast searching and enumeration, as described in more detail below, increase computational efficiency and reduce the number of operations; consequently, computational speed is increased. After an anomaly has been detected, it can be corrected, or eliminated, prior to further processing of the measurements.

FIG. 1 shows a high-level flowchart of steps for processing measurements, according to an embodiment of the invention.

Measurements 101 include pseudo-ranges, carrier phase increments over an epoch, and unambiguous phases measured at the base navigation receiver and at the rover navigation receiver. For the unambiguous phases, initial processing to calculate estimates of the ambiguities were previously performed. In step 102, single differences of the measurements measured at the rover navigation receiver and the corresponding measurements measured at the base navigation receiver are calculated.

In step 104, a state vector is determined from the single differences. Step 104 includes correcting the pseudo-range single differences and the unambiguous phase single differences for troposphere delays. In an embodiment, the Gauss-Newton process is used for determining the state vector. The troposphere corrections depend on the rover position and are evaluated during the Gauss-Newton process.

The process then passes to step 106, in which residuals of the single differences are calculated. As discussed above, residuals are determined by subtracting values of single differences calculated from an observation model from the single differences calculated from the measurements. In an embodiment, multiple iterations of the Gauss-Newton process are used to generate a final set of residuals.

The process then passes to step 108, in which measurement consistency is checked. Consistency criteria are discussed in more detail below. The process then passes to decision step 110. If the set of measurements is consistent, then the process generates output 111, which includes the rover position (as specified by rover coordinates) and flags identifying which measurements, if any, are anomalous (referred to herein as measurement flags).

If the set of measurements is not consistent, then the process passes to step 114, in which anomalies are detected and removed. The process then passes to decision step 116. If the state vector cannot be determined from the remaining measurements, then the process passes to step 118, in which all the measurements are eliminated. In order for the state vector to be determined, the remaining measurements need to include measurements from at least four satellites. If the state vector can be determined from the remaining measurements, then the process passes to step 120, in which the state vector is corrected; that is, the state vector is re-calculated after the anomalous measurements have been removed. Correction can be done with a more efficient technique than least square method (LSM) for the remaining measurements. In an embodiment, a technique based on the peer-to-peer LSM modification (described in more detail below) is used. The process then returns to step 106 for another iteration.

In step 108, different criteria can be used to determine whether or not the measurements are consistent. Herein, measurements from the rover receiver and corresponding measurements from the base receiver are consistent if their single differences are consistent with the observation model. Examples of consistency criteria include the following:

Measurements are consistent if the absolute value of each residual does not exceed a user-defined threshold value. This method is effective if a behavioral model is a priori known.

Measurements are consistent if the absolute value of each weighted residual does not exceed a user-defined threshold value. A weighted residual is a residual multiplied by a factor referred to as a weight. Each residual can be multiplied by a different weight. More details are described below.

Measurements are consistent if the weighted sum of residual squares (WSRS) does not exceed a user-defined threshold value. This method is comprehensive, since it uses all the measurements. More details of WSRS are described below.

Any combination of the above criteria can also be used via the logical operations "AND" or "OR".

In step 114, different search methods can be used to detect an anomaly. Examples of search methods include:

Search for a maximum absolute value of a residual. The corresponding measurement is regarded as an anomaly.

Search for a maximum absolute value of a weighted residual. The corresponding measurement is regarded as an anomaly.

Search for a specific measurement such that removal of the specific measurement will result in a minimal value of WSRS for the updated solution. This method examines the measurements one at a time.

After at least one anomalous measurement has been detected, a single measurement or a group of measurements can be selected to be designated as anomalous and corrected or eliminated. Methods for selection include:

Only the detected measurement is designated to be anomalous.

All measurements for the current channel are designated to be anomalous. If the code measurement is anomalous, the carrier phase measurement is also designated to be anomalous. Similarly, if the carrier phase measurement is anomalous, the code measurement is also designated to be anomalous.

If measurements on the civilian channel are anomalous, measurements on the protected channel are also designated to be anomalous. In GPS and GLONASS, some signals can be decoded by all users, and some signals can be decoded only by authorized users (such as the military). For GPS, the protected P-signal can be decoded by using the civilian C-signal information.

All measurements from the satellite from which an anomaly was detected are designated to be anomalous.

The choice of method influences the performance of the anomaly detector.

Embodiments of anomaly detectors (as shown in FIG. 1) are described below.

Anomaly Detector Based on Pseudo-Range Single Differences. Single differences of pseudo-ranges are calculated. The ionospheric contribution is assumed to be negligible or compensated by a model. By solving equations for pseudo-range single differences, a differential code solution can be obtained. A WSRS can be calculated from this solution. If this sum exceeds a user-defined threshold value, a decision concerning anomalies is made and correction follows.

Anomaly Detector Based on Carrier Phase Single Difference Increments over an Epoch. For the first epoch, rover coordinates are determined using only code measurements to determine pseudo-ranges. Starting from the second epoch, and using carrier phase increments over an epoch, rover coordinate increments (changes in coordinates) are determined. The current coordinates can be determined by adding coordinate increments to previous coordinates. If there are no anomalies (cycle slips), the rover coordinate increments are calculated at carrier phase (cm) accuracy, but the entire rover trajectory is shifted relative to the true trajectory (by tens of meters in the stand-alone mode and by tens of cm in DGPS mode). The shift arises from inaccuracy of the initial coordinates determined from the code measurements. Further details are provided below.

Anomaly Detector Based on Unambiguous Phase Single Differences. Single differences of unambiguous phase measurements are calculated. A differential phase solution can be obtained by solving the equations with respect to single differences of unambiguous phases. A WSRS can be calculated from this solution. If this WSRS exceeds a user-defined threshold value, a decision concerning anomalies is made and correction follows.

Examples of algorithms for detection of anomalies are discussed below. These algorithms fall into two categories: detection of anomalies during the calculation of positions and detection of anomalies before resolution of ambiguities. Detection of anomalies during the calculation of positions results in more precise coordinates. Detection of anomalies before resolution of ambiguities provides a better estimate of the ambiguities (which in turn also affects the calculation of positions).

Definition of Variables and Notation Convention. In the algorithms below, the following variables and notation are used. Vectors and matrices are shown in bold font.

$r=(x, y, z)^T$ is the position vector, also referred to herein as the radius vector, in the World Geodetic System 84 (WGS 84) coordinate frame referenced to the center of the Earth. Components $\{r\}_x$, $\{r\}_y$, $\{r\}_z$ designate vector projections onto the corresponding Cartesian x, y, z axes.

The set of index numbers $_{r,k}^{f,s}$ refer to the following:

f is the index number of the frequency band (for example, f=1 can refer to the $L_1$ frequency band, and f=2 can refer to the $L_2$ frequency band). Future GNSSs can have more than two frequency bands.

s is the index number of a satellite.

r is the index number of a receiver (r=0 refers to the rover receiver, and r=1 refers to the base receiver.)

k is the index number of a system time instant.

$\rho_{r,k}^{f,s}$ are line-of-sight pseudo-ranges (in meters) between satellite s and receiver r; pseudo-ranges are also referred to as code measurements. $\varphi_{r,k}^{f,s}$ are line-of-sight carrier phase measurements (in meters) between satellite s and receiver r. Here $\varphi_{r,k}^{f,s}$ represent the carrier phases in cycles multiplied by the carrier wavelength.

c is the speed of light ($2.99792458 \times 10^8$ m/s).

$R_{r,k}^{f,s}=R(r_{r,k}^s+b_{r,k}^{f,s}, r_{r,k}^s+c_{r,k}^{f,s})$ is the distance from the phase center of the transmitting antenna on satellite s to the phase center of the receiving antenna on receiver r, where:

$R(r,r')=|r-r'|+c^{-1}\Omega_e(\{r'\}_x \cdot \{r\}_y - \{r'\}_y \cdot \{r\}_x)$ is the geometric distance from the satellite s with radius vector r' to the point with radius vector r plus a correction factor accounting for the rotation of the Earth.

$\Omega_e$ is the angular rotational speed of the Earth $(c^{-1}\Omega_e=2.432387791\times 10^{-13} m^{-1})$.

$r_{r,k}^s$ is the radius vector of satellite s at the instant that the satellite signal is received at receiver r. Satellite signals are broadcast (transmitted) at different time instants. Also, a satellite signal broadcast at a single time instant will arrive at different receivers at different time instants. Therefore, the values of $r_{r,k}^s$ can vary from one receiver to another.

$b_{r,k}^{f,s}$ is the displacement vector of the phase center (for the frequency band f) of the receiving antenna on the receiver r relative to the antenna reference point; this vector depends on the direction of satellite s. More explicitly: $b_{r,k}^{f,s}=offs_{r,k}^f+PCV^f(\theta_{r,k}^s) \cdot h_{r,k}^s$. Here, the term $offs_{r,k}^f$ represents the phase offset (independent of direction); $PCV^f(\theta_{r,k}^s)$ represents the phase center variation (dependent on elevation angle); and $h_{r,k}^s$ represents the directional cosine from satellite to receiver. The second term accounts for the directional properties of antennas operating in different frequency bands.

$c_{r,k}^{f,s}$ is the displacement vector of the phase center (for the frequency band f) of the transmitting antenna on the satellite s relative to the center-of-mass of the satellite; in general, this displacement depends on the direction to the receiver r. More explicitly:

$$c_{r,k}^{f,s} = \widetilde{offs}_k^{f,s} + \widetilde{PCV}^{s,f}(\tilde{\theta}_{r,k}^s) \cdot h_{r,k}^s.$$

Here the term $\widetilde{offs}_k^{f,s}$ represents the offset from the center-of-mass of the satellite to the transmitting antenna on the satellite;

$$\tilde{\theta}_{r,k}^s$$

represents the elevation angle from the satellite antenna plane; and $\widetilde{PCV}^{s,f}$ represents the satellite phase center variation. Note that the effect of $c_{r,k}^{f,s}$ is negligible when single differences of measurements or time increments of measurements (or both) are processed.

$\lambda^{f,s}$ is the wavelength of the carrier signal transmitted by satellite s on frequency band f. The Global Positioning System (GPS) and GALILEO (GAL) use code-division multiple access (CDMA), and GLONASS (GLN) uses frequency-division multiple access (FDMA). Wavelength is related to carrier frequency ω according to $$\lambda = \frac{c}{\omega}.$$

For GPS and GAL, the wavelength is the same for all carriers within the same frequency band f. For GLN, for frequency band f, a carrier frequency is specified by a center frequency $F_0^f$ and a frequency increment $\Delta F_0^f$. For each satellite s, there is a corresponding satellite frequency channel number $l^s$ (an integer). The carrier frequency for satellite s is then $F^{f,s}=F_0^f+\Delta F_0^f \cdot l^s$. The corresponding wavelength is $$\lambda^{f,s} = \frac{c}{F^{f,s}} = \frac{c}{F_0^f + \Delta F_0^f \cdot l^s},$$

which can be transformed into the expression $$\lambda^{f,s} = \frac{c/F_0^f}{1+(\Delta F_0^f/F_0^f) \cdot l^s} = \frac{\lambda_0^f}{1+\varepsilon_0^f \cdot l^s},$$

where $\lambda_0^f=c/F_0^f$, $\varepsilon_0^f=\Delta F_0^f/F_0^f$. To maintain uniform convention for all GNSSs, channels in GPS and GAL are assigned a parameter $\varepsilon_0^f$ as well (this parameter is equal to zero, since the increment between satellite frequency channel numbers is zero). For GLN frequency bands:

$$\varepsilon_0^{GLN,L1} = \frac{562500}{1602000000} = \frac{1}{2848} \approx 3.511e\text{-}004$$

$$\varepsilon_0^{GLN,L2} = \frac{437500}{1246000000} = \frac{1}{2848} \approx 3.511e\text{-}004$$

-continued $$\varepsilon_0^{GLN.L3} = \frac{421875}{1201500000} = \frac{1}{2848} \approx 3.511e\text{-}004.$$

These values are therefore the same for different frequency bands. As discussed above, for GPS and GAL, these values are also the same for different frequency bands since they are all equal to zero. For any GNSS, therefore, the assumption holds that $\varepsilon_0^f$ does not depend on the frequency band. This value is referred to as $\varepsilon_0^{SYS}$, where SYS refers to a particular GNSS.

- $\tau_k^s$ and $\tau_{r,k}$ are the clock offsets of the satellite clock and the receiver clock, respectively, relative to the system time.
- $\delta\tau_{r,k}^{(P)f,s}$ and $\delta\tau_{r,k}^{(\varphi)f,s}$ are the code-measurement channel delay and phase-measurement channel delay, respectively. These delays result from radiofrequency (RF) and digital signal processing of the satellite signals received by a receiver. To a good approximation, it can be assumed that the values do not depend on satellite, time, and measurement type; therefore $\delta\tau_{r,k}^{(P)f,s} = \delta\tau_{r,k}^{(\varphi)f,s} \equiv \delta\tau_r^f$.
- $T_{r,k}^s$ is the troposphere delay. This delay is caused by the refraction coefficient of troposphere.
- $I_{r,k}^{f_{ref},s}$ is the ionosphere delay caused by propagation of the satellite signal through the ionosphere. More explicitly: For a sufficiently high carrier frequency $F^{f,s}$, $$I_{r,k}^{f_{ref},s} = \frac{C}{[F^{f,s}]^2}\int_L n_e ds, \quad L = L_{r,k}^s, \quad n_e = n_e(x, y, z, t_k),$$

where $n_e$ is the electron density, L is the signal trajectory, C is a constant, and ds is a differential distance along the propagation path. Note that the frequency dependence arises from the $[F^{f,s}]^2$ term. An arbitrary reference band with index number $f_{ref}$ (for example, $L_1$) can be chosen; then $$I_{r,k}^{f,s} = \frac{C}{[F^{f,s}]^2}\int_L n_e ds$$

$$= \frac{[F^{f_{ref},s}]^2}{[F^{f,s}]^2} \frac{C}{[F^{f_{ref},s}]^2}\int_L n_e ds.$$

$$= \frac{[F^{f_{ref},s}]^2}{[F^{f,s}]^2} I_{r,k}^{f_{ref},s}$$

$$\mu^{f/f_{ref},s} = \frac{[F^{f_{ref},s}]^2}{[F^{f,s}]^2} = (\lambda^{f,s}/\lambda^{f_{ref},s})^2$$

is the ionosphere frequency ratio, where $f_{ref}$ is the index number of a reference frequency band.

- $M_r^{f,s} \equiv N_r^{f,s} + \varphi_{r,0}^{f,s}$ are floating point ambiguities; where $N_r^{f,s}$ are integer ambiguities;
- $\varphi_{r,0}^{f,s} = \varphi_0^{f,s} - \varphi_{r,0}^f$ is the phase offset which is the initial phase of the satellite reference oscillator minus the initial phase of the receiver reference oscillator.
- $\psi_{r,k}^s = \psi_{r,k}^{(\perp),s} + \psi_{r,k}^{(P),s}$ is the phase incursion (phase increment) due to change in mutual orientation of the antenna on satellite s and the antenna on receiver r. It includes a linear increment $\psi_{r,k}^{(\perp),s}$ caused by turning the antennas in the plane of their dipole axes, and a nonlinear increment $\psi_{r,k}^{(P),s}$ caused by mutual deviation of axes normal to antenna dipoles from the line of sight.
- $\zeta_{r,k}^{(P)f,s}$ and $\zeta_{r,k}^{(\varphi)f,s}$ are code noise error (including DLL errors and multipath errors) and phase noise error (including PLL errors and multipath errors), respectively. They are considered to be white Gaussian noise with zero expected (mean) values and non-zero variances. The standard deviation (STD) value of code noise error is approximately 1 m, and the STD value of phase noise error is approximately 1 cm.

Signal-to-noise ratio is designated $SNR_{r,k}^{f,s}$.

Observation Equations

Received satellite signals are processed by channel algorithms to generate raw measurements (or, more precisely, estimates of raw measurements). In some embodiments, the raw measurements are smoothed. The raw measurements then undergo further processing depending on the particular operating mode (stand-alone, DGPS, or RTK).

An embodiment of an observation model is based on the following mathematical model. The mathematical model is applicable to raw measurements for all global navigation satellite systems (GNSSs) and can be formulated by the following observation equations:

$$\rho_{r,k}^{f,s} = R_{r,k}^{f,s} + c(\tau_{r,k} + \delta\tau_{r,k}^{(P)f,s} - \tau_k^s) + T_{r,k}^s + \mu^{f/f_{ref},s} I_{r,k}^{f_{ref},s} + \zeta_{r,k}^{(P)f,s} \quad (E1)$$

and $$\varphi_{r,k}^{f,s} = R_{r,k}^{f,s} + c(\tau_{r,k} + \delta\tau_{r,k}^{(\varphi)f,s} - \tau_k^s) + T_{r,k}^s + \mu^{f/f_{ref},s} I_{r,k}^{f_{ref},s} + \lambda^{f,s}(M_r^{f,s} + \psi_{r,k}^s) + \zeta_{r,k}^{(\varphi)f,s} \quad (E2)$$

The observation equation for the pseudo-range single differences is then:

$$\rho_k^{f,s} = R_{0,k}^s + c(\tau_k + \delta\tau_k^{(P)f}) + \mu^{f/f_{ref},s} I_k^s + \zeta_k^{(P)f,s}; \quad (E3)$$

and the observation equation for the carrier phase single differences is then:

$$\varphi_k^{f,s} = R_{0,k}^s + c(\tau_k + \delta\tau_k^{(\varphi)f}) - \mu^{f/f_{ref},s} I_k^s + \lambda^{f,s}(M^{f,s} + \psi_k^{(\perp)}) + \zeta_k^{(\varphi)f,s}. \quad (E4)$$

In (E3) and (E4):

For simplicity, the single differences operator $\Delta_{0,1}$ has been omitted. For example, the pseudo-range single differences are $$\Delta_{0,1}(\rho_{r,k}^{f,s}) = \rho_{r=0,k}^{f,s} - \rho_{r=1,k}^{f,s} \rightarrow \rho_k^{f,s};$$

and the carrier phase single differences are $$\Delta_{0,1}(\varphi_{r,k}^{f,s}) = \varphi_{r=0,k}^{f,s} - \varphi_{r=1,k}^{f,s} \rightarrow \varphi_k^{f,s}.$$

Ranges are referenced to the antenna reference point.

The following parameters are compensated (cancelled):
- Calculated range from a satellite to the base
- Troposphere contribution
- Phase incursion (increment) caused by changing the mutual orientation of the satellite antenna and the receiver antenna
- Antenna phase center offsets (offsets between the antenna reference point and the antenna phase center for the rover antenna and the base antenna).

$I_k^s$ designates single differences of ionosphere errors for the reference frequency.

In (E3) and (E4), solving for the individual variables (more precisely, estimates of individual variables), requires additional information in some instances. Some combinations of the variables, however, can be estimated by processing double differences.

A double difference of a variable refers to the difference of a variable as a function of the satellite whose signal is received and processed. A particular satellite is selected as a reference satellite $s_{ref}$. Typically, the reference satellite is chosen as the satellite with the highest elevation angle. For a variable corresponding to a (non-reference) satellite s, the double difference operator is represented by the symbol $\nabla^{s,s_{ref}}$. Then, for example, $$\nabla^{s,s_{ref}} I_k = I_k^s - I_k^{s_{ref}};$$

$$\nabla^{s,s_{ref}} M^f = M^{f,s} - M^{f,s_{ref}} = \nabla^{s,s_{ref}} N^f;$$

$$\nabla^{s,s_{ref}} N^f = N^{f,s} - N^{f,s_{ref}}.$$

The following variables are defined:

$$\{\Gamma_k^f = c\tau_k + c\delta\tau^f + \mu^{f/f_{ref}} I_k^{s_{ref}}\}_f,$$

$$\{\Psi_k^f = (\psi_k^{(\perp)} + M^{f,s_{ref}}) - 2\mu^{f/f_{ref}} I_k^{s_{ref}}/\lambda^{f,s_{ref}}\}_f,$$

$$\{\nabla^{s,s_{ref}} N^f\}_{f,s \neq s_{ref}},$$

$$\{\nabla^{s,s_{ref}} I^s\}_{s \neq s_{ref}}.$$

Here, $\{\Gamma_k^f\}_f$ refers to the set of $\Gamma_k^f$ for all values of f, and $\{\nabla^{s,s_{ref}} N^f\}_{f,s \neq s_{ref}}$ refers to the set of $\nabla^{s,s_{ref}} N^f$ for all values of f and for all satellites s, excluding the reference satellite $s_{ref}$. The set of equations, (E3) and (E4), previously expressed as a function of the set of variables $r_{0,k}$,
$c\tau_k$,
$\psi_k^{(\perp)}$,
$\{c\delta\tau^f\}_{f \neq f_{ref}}$,
$\{M^{f,s}\}_{f,s}$,
$\{I^s\}_s$ can then be expressed as a function of the set of variables:
$\{\Gamma_k^f\}_f$
$\{\Psi_k^f\}_f$
$r_{0,k}$,
$\{\nabla^{s,s_{ref}} N^f\}_{f,s \neq s_{ref}}$,
$\{\nabla^{s,s_{ref}} I^s\}_{s \neq s_{ref}}$.

The observation equation for the carrier phase single differences is then:

$$\varphi_k^{f,s} = R_{0,k}^s + \Gamma_k^f + \lambda^{f,s} \Psi_k^f - \mu^{f/f_{ref}} \nabla^{s,s_{ref}} I_k + \lambda^{f,s} \nabla^{s,s_{ref}} N^f - 2\mu^f f^{ref}(1 - \lambda^{f,s}/\lambda^{f,s_{ref}}) I_k^{s_{ref}} + \zeta_k^{(\varphi)f,s}. \quad (E5)$$

The term $2\mu^{f/f_{ref}}(1-\lambda^{f,s}/\lambda^{f,s_{ref}}) I_k^{s_{ref}}$ is zero for GPS and GAL, and is less then 1 cm for GLN; therefore, this term can be assumed to be zero for all systems. With this assumption, the observation equations become $$\rho_k^{f,s} = R_{0,k}^s + \Gamma_k^f + \mu^{f/f_{ref}} \nabla^{s,s_{ref}} I_k + \zeta_k^{(\rho)f,s} \quad (E6)$$

and $$\varphi_k^{f,s} = R_{0,k}^s + \Gamma_k^f + \lambda^{f,s} \Psi_k^f - \mu^{f/f_{ref}} \nabla^{s,s_{ref}} I_k + \lambda^{f,s} \nabla^{s,s_{ref}} N^f + \zeta_k^{(\varphi)f,s}. \quad (E7)$$

Now consider the calculation of the rover position from code measurements (code positioning) and the calculation of the rover position from carrier phase measurements (phase positioning). The short baseline ionospheric delays $\{\nabla^{s,s_{ref}} I\}_{s \neq s_{ref}}$ are assumed to be zero. The single-difference observation equations for code positioning (E6) then reduce to:

$$\rho_k^{f,s} = R_{0,k}^s + \Gamma_k^f + \zeta_k^{(\rho)f,s}. \quad (E8)$$

In case of phase positioning, ambiguities $\{\nabla^{s,s_{ref}} N^f\}_{f,s \neq s_{ref}}$ are assumed to be known and compensated; therefore, the single-difference observation equations for phase positioning (E7) then reduce to:

$$\varphi_k^{f,s} = R_{0,k}^s + \Gamma_k^f + \lambda^{f,s} \Psi_k^f + \zeta_k^{(\varphi)f,s}. \quad (E9)$$

Receiver Clock Offsets.

Receiver clock offsets need to be corrected. One method attempts to eliminate clock offsets from measurements by processing double differences. If the double difference operator is applied to (E8), then $$\nabla^{s,s_{ref}} \rho_k^f = \nabla^{s,s_{ref}} R_{0,k} + \mu^{f/f_{ref}} \nabla^{s,s_{ref}} I_k + \nabla^{s,s_{ref}} \zeta_k^{(\rho)f}. \quad (E10)$$

Note that the clock term $\Gamma_k^f$ is eliminated. The noise terms, $\nabla^{s,s_{ref}} \zeta_k^{(\rho)f} = \zeta_k^{(\rho)f,s} - \zeta_k^{(\rho)f,s_{ref}}$, however, are correlated, since the common noise $\zeta_k^{(\rho)f,s_{ref}}$ term is present in the equations. For GPS and GAL, applying the double difference operator to (E9) then yields:

$$\nabla^{s,s_{ref}} \varphi_k^{f,s} = \nabla^{s,s_{ref}} R_{0,k}^s - \mu^{f/f_{ref}} \nabla^{s,s_{ref}} I_k + \lambda^{f,s} \nabla^{s,s_{ref}} N^f + \nabla^{s,s_{ref}} \zeta_k^{(\varphi)f,s}. \quad (E11)$$

For GPS and GAL the clock term, $\Gamma_k^f$, and the phase offset term, $\Psi_k^f$, are eliminated. The noise terms, however, again are correlated. For GLN, the analysis is more involved because different wavelengths are involved. There are then two types of double differences. The first type eliminates $\Gamma_k^f$; and the second type eliminates $\Psi_k^f$. In both instances, however, the noise terms are correlated. The correlation of double differences presents computational complexity because calculation of a covariance matrix and its inversion to produce a weight matrix are needed. Also, as discussed above, double difference processing for GLN presents additional processing. Therefore, a direct double difference approach is not satisfactory for eliminating receiver clock offsets and phase offsets.

In an embodiment, a technique for eliminating clock offsets and phase offsets is based on Householder's transformations to the corresponding normalized equations. A normalized equation refers to an observation equation in which all the terms are divided by the standard deviation (STD) of the noise; the STD of the normalized noise is then equal to one. The method has less computational complexity and greater computational stability than the double differences approach. Less computational complexity ensues because the equations are already normalized and do not require a covariance matrix and a weight matrix. Greater computational stability ensues because Householder's transformations inherently possess better stability. Details of Householder's transformations are described in C. L. Lawson and R. J. Hanson, "Solving Least Squares Problems", Prentice-Hall, Inc., Englewood Cliffs, N.J., USA (1974) ["Lawson"] and in G. H. Golub and C. F. Van Loan, "Matrix Computations", The Johns Hopkins University Press, Baltimore, Md., USA (Third Edition, 1996) ["Golub"].

Consider the pseudo-range equation (E8) for one frequency. First write a matrix and a vector of the observation model with normalized noise:

$$[\overline{w}^{(\rho)f} \overline{H}_{cos}^{(\rho)f}]$$

$$\overline{H}_{cos}^{(\rho)f} = ([\sigma^{(\rho)f,s}]^{-1} [h_{0,k}^{(a)s}]^T)_s$$

$$\overline{y}^{(\rho)f} = ([\sigma^{(\rho)f,s}]^{-1} \nabla_{0,1} \delta\rho_k^{(a)f,s})_s. \quad (E12)$$

Here $\sigma^{(\rho)f,s}$ stands for the code single difference noise standard deviation (STD). $\overline{w}^{(\rho)f} = ([\sigma^{(\rho)f,s}]^{-1})_s$ is the column vector containing STD $\sigma^{(\rho)f,s}$, also referred to as weight roots. The superscript a refers to the a priori position used in the calculation of residuals. The inverse to the covariance matrix is called the weight matrix in the case of measurements covariance and the information matrix in case the case of estimate covariance. Here, a square root of a weight matrix is calculated. Calculation of single difference square root weights is simpler than the calculation of a double difference weight matrix (which is non-diagonal). To simplify the notation, the index $_k$ of time instant has been omitted.

Next, use Householder's reflection (see Lawson) to expand the matrix $[\overline{w}^{(\varphi)f} \overline{H}_{cos}^{(\varphi)f} | \overline{y}^f]$. This operation sets all the column elements (except for the first one) $\overline{w}^f$ equal to zero, resulting in $$\begin{bmatrix} C_{\tau,\tau}^{(\rho)f} & C_{\tau,r}^{(\rho_r)f} & c_{\tau}^{(\rho)f} \\ 0_{NS-1\times 1} & \overline{H}_{DD}^{(\rho)f} & \overline{y}_{DD}^{(\rho)f} \end{bmatrix}. \tag{E13}$$

Here NS is the number of acceptable measurements for the given frequency$^f$. NS is determined as follows. A measurement is designated to be "acceptable" if the channel has a SNR greater than or equal to a SNR threshold value and the corresponding satellite has an elevation greater than or equal to an elevation threshold value. These measurements should be marked as "acceptable" by channel algorithms and by anomaly detectors. If the channel has a SNR less than the SNR threshold value, or if the corresponding satellite has an elevation less than the elevation threshold value, the measurements of the channel or satellite should be marked as "unacceptable" by channel algorithms and by anomaly detectors.

The clock offset corresponds to the first row of the matrix (E13). The rest of the rows of this matrix determine the normalized equations for pseudo-range double differences. This result follows because the operation of calculating pseudo-range double differences corresponds to the operation of multiplying observation equations by the matrix, which sets coefficients of clock offset to zero. The same operation is performed here, but with a different matrix. As a result, linearized equivalent observation equations for code measurements with the expanded matrix $[\overline{H}_{DD}^{(\rho)f} | \overline{y}_{DD}^{(\rho)f}]$ are obtained. These do not depend on clock offset.

Next, consider the procedure for eliminating clock offset and phase offset for phase positioning equation (E9). First, write a matrix and a vector of the observation model with normalized noise:

$[\overline{w}^{(\varphi)f} \overline{\lambda}^{(\varphi)f} \overline{H}_{cos}^{(\varphi)f}]$ $\overline{H}_{cos}^{(\varphi)f} = ([\sigma^{(\varphi)f,s}]^{-1} [h_{0,k}^{(a)s}]^T)_s$ $\overline{\lambda}^{(\varphi)f} = ([\sigma^{(\varphi)f,s}]^{-1} \lambda^{f,s})_s$ $\overline{y}^{(\varphi)f} = ([\sigma^{f,s}]^{-1} \Delta_{0,1} \delta \varphi_k^{(a)f,s})_s. \tag{E14}$ Compared to matrix (E13), matrix (E14) has an extra column $\overline{\lambda}^{(\varphi)f}$. For GPS and GAL, this column is proportional to the vector $\overline{w}^{(\varphi)f}$. Therefore, for these systems, it is sufficient to combine the corresponding variables into one and apply the scheme previously used to eliminate clock offset for (E8) (that is, use the variable $\tilde{\Gamma}_k^f = \Gamma_k^f + \lambda^{f,s} \Psi_k^f$).

For GLONASS, as discussed above, $$\lambda^{f,s} = \frac{\lambda_0^f}{1 + \varepsilon_0^f \cdot l^s}.$$

Express vector $\overline{w}^{(\varphi)f}$ as a sum of a projection onto vector $\overline{\lambda}^{(\varphi)f}$ and an additional component:

$$\overline{w}^{(\varphi)f} = [\lambda_0^f]^{-1} (1 - \varepsilon_0 l^{(av)}) \cdot \overline{\lambda}^{(\varphi)f} + \varepsilon_0^f \overline{b}^{(\varphi)f} \tag{E15}$$

-continued $$\overline{b}^{(\varphi)f} = ([\sigma^{(\varphi)f,s}]^{-1} (l^s - l^{(av)}) \lambda^{f,s} / \lambda_0^f)_s$$

$$l^{(av)} = \frac{\sum_s (\lambda^{f,s} / \sigma^{(\varphi)f,s})^2 l^s}{\sum_s (\lambda^{f,s} / \sigma^{(\varphi)f,s})^2}.$$

Since $\varepsilon_0^f$ is negligible, vectors $\overline{w}^{(\varphi)f}$, $\overline{\lambda}^{(\varphi)f}$ are almost parallel. This results in a worse matrix conditioning than if columns $\overline{w}^{(\varphi)f}$, $\overline{\lambda}^{(\varphi)f}$ are directly eliminated.

Assume that there is a clock offset estimate $\Delta_{0,1} c \tau_k^{(a)f}$ with error $v_k^{(c\tau,a)f}$. Such an estimate can be determined, for example, from a code solution. Then, compensating for $\Gamma_k^{(a)f}$ in (E14), obtain equations $\overline{y}^{(\varphi)f} = \varepsilon_0^f v_k^{(c\tau,a)f}$ $\overline{b}^{(\varphi)f} + ([\lambda_0^f]^{-1} (1 - \varepsilon_0 l^{(av)}) v_k^{(c\tau,a)f} + \partial_1 \psi_{r,k}^{\%f}) \overline{\lambda}^{(\varphi)f} + \overline{H}_{cos}^{(\varphi)f} \cdot \Delta r_k,$ \hfill (E16)

which contain a residual error determined by the vector $\varepsilon_0^f v_k^{(c\tau,a)f} \overline{b}^{(\varphi)f}$. Therefore, if the value $|\varepsilon_0^f v_k^{(c\tau,a)f}| \cdot |\overline{b}^{(\varphi)f}|$ lies within user-defined limits, it can be neglected. Most of the error $v_k^{(c\tau,a)f}$ goes into the estimate of the value $\Psi_k^f$ and does not substantially affect the coordinate estimate.

Another method for eliminating clock offset and phase offset utilizes addition of the equation from the code task to the extended matrix (E14) as follows:

$$\begin{bmatrix} C_{\tau,\tau}^{(\rho)f} & 0 & C_{\tau,r}^{(\rho_r)f} & c_{\tau}^{(\rho)f} \\ \overline{w}^{(\varphi)f} & \overline{\lambda}^{(\varphi)f} & \overline{H}_{cos}^{(\varphi)f} & \overline{y}^{(\varphi)f} \end{bmatrix}. \tag{E17}$$

The elimination of clock offset and phase offset is performed by two successive Householder's transformations of (E17). The first transformation resets subdiagonal elements of the first column (sets them to 0); the second transformation resets subdiagonal elements of the second column:

$$\begin{bmatrix} C_{\tau,\tau}^{(\varphi)f} & C_{\tau,\Delta\psi}^{(\varphi)f} & C_{\tau,r}^{(\varphi_r)f} & c_{\tau}^{(\varphi)f} \\ 0 & C_{\Delta\psi,\Delta\psi}^{(\varphi)f} & C_{\Delta\psi,r}^{(\varphi)f_r} & c_{\Delta\psi}^{(\varphi)f} \\ 0_{NS-1\times 1} & 0_{NS-1\times 1} & \overline{H}_{DD}^{(\varphi)f} & \overline{y}_{DD}^{(\varphi)f} \end{bmatrix}. \tag{E18}$$

As a result, obtain linearized observation equations for unambiguous phases with expanded matrix $[\overline{H}_{DD}^{(\varphi)f} | \overline{y}_{DD}^{(\varphi)f}]$ that are independent of clock offset and phase offset. This method for eliminating clock offset and phase offset provides a heuristic procedure for co-processing code and carrier phase measurements.

Positioning.

Positioning is implemented according to normal equations. Matrices are generated according to:

$$D = \sum_f [\overline{H}^f]^T [\overline{H}^f] \tag{E19}$$

$$d = \sum_f [\overline{H}^f]^T [\overline{y}^f]$$

and a correction to the current position is determined:

$\Delta r = D^{-1} \cdot d.$ \hfill (E20)

$\overline{H}^f$, $\overline{y}^f$ correspond to the normalized double differences obtained from (E13), (E17), and (E18). d is referred to as an information vector. D is referred to as an information matrix of estimate. It is related to the covariance matrix P as follows: $P=D^{-1}$. The combined set $\{D,d\}$ is called information coordinates.

Generating Residuals.

In solving a problem with normalized double difference combinations, coordinate estimates are determined using double differences, but clock offset $\Gamma_k^f$ and phase offset $\Psi_k^f$ are not determined. To correct anomalies, single differences are defined instead of double differences. It is important to make sure that reference satellite anomalies do not affect all the remaining measurements. For example, for one frequency, the following code measurements are available:

$$\bar{y}^{(\rho)f} = \bar{H}^{(\rho)f} x^f \qquad (E21)$$

$$\bar{H}^{(\rho)f} := [\bar{w}^{(\rho)f} \ \bar{H}_{cos}^{(\rho)f}]$$

$$x^f = \begin{bmatrix} c\tau^f \\ \Delta r \end{bmatrix}.$$

Assume equations (E21) are linearized for a code solution. Then the estimate of the position correction is equal to zero: $\Delta r=0$. Vector $\bar{y}^{(\rho)f}$ is the vector of partial residuals based on geometric coordinates. Then (E21) transforms into:

$$\bar{y}^{(\rho)f} = \bar{w}^{(\rho)f} c\tau^f \qquad (E22)$$

with unknown $\Gamma^f$. The value $\Gamma^f$ can be estimated as follows:

$$\hat{\Gamma}^f = \frac{\langle \bar{y}^{(\rho)f}, \bar{w}^{(\rho)f} \rangle}{\langle \bar{w}^{(\rho)f}, \bar{w}^{(\rho)f} \rangle}$$

and compensate it from (E22):

$$\delta\bar{y}^{(\rho)f} = \bar{y}^{(\rho)f} - \bar{w}^{(\rho)f}\hat{\Gamma}^f. \qquad (E23)$$

Vector $\delta\bar{y}^{(\rho)f}$ is the desired vector of single difference residuals. In (E23), LSM-estimate of clock offset has been used. Single differences residuals for other anomaly detectors are defined in a similar way.

Criteria for Detecting Anomalies.

Anomaly criteria are used to specify when there is an anomaly in the current set of measurements. The weighted sum of residual squares (WSRS) $|\delta\bar{y}|^2$ has a distribution $\chi^2(m-n)$ [see Lawson], where m is the number of equations, and n is the number of unknowns. In an embodiment, measurements are anomalous if $$|\delta\bar{y}|^2 > \chi_{1-\alpha}^2(m-n), \qquad (E24)$$

where $\alpha$ is the confidence level for the measurements. Here measurements refer to the code single differences, phase single differences, and phase increments single differences.

In another embodiment, measurements are anomalous if the residuals $|\delta y_i|$ or the weighted residuals $|\delta\bar{y}_i|$ exceed user-specified threshold values:

$$|\delta y_i| > \text{MaxRes} \qquad (E25)$$

or $$|\delta\bar{y}_i| > \text{Max}W\text{Res}. \qquad (E26)$$

For example, value of MaxWRes=3 corresponds to the "three sigmas rule".

Consider a linear model of observation:

$$y = Hx + \zeta. \qquad (E27)$$

Then consider the corresponding observation model with normalized noise:

$$\bar{y} = \bar{H}x + \bar{\zeta}. \qquad (E28)$$

If anomalies are not present, then the weighted sum of residuals squares $|\delta\bar{y}(\hat{x})|^2$ has a distribution $\chi^2(m-n)$, where m is the number of equations, and n is the number of unknowns. Now assume two hypotheses:

$H_0$: the sum of residuals squares has a distribution $\chi^2(m-n)$ (no anomalies present).

$H_1$: the sum of residuals squares has a different distribution (at least one anomaly present).

Designate the probability of a type 1 error (also referred to as a "false alarm") as $\alpha$. According to a criterion based on the $\chi^2$ distribution, a measurement is anomalous if:

$$|\delta\bar{y}|^2 > \chi_{1-\alpha}^2(m-n). \qquad (E29)$$

If the weighted sum of residuals squares exceeds a threshold value (which is a fractile of the distribution) $\chi_{1-\alpha}^2(m-n)$, then an anomaly is assumed to be present.

Elimination of anomalous measurements can be done according to the following method. For the range $i=\overline{1,m}$, remove the i-th equation from the observation model. Then solve the LSM task and determine the weighted sum of residuals squares $|\delta\bar{y}_{(i)}(\hat{x}_{(i)})|^2$ for solution $\hat{x}_{(i)}$. The measurement for which the value $|\delta\bar{y}_{(i)}(\hat{x}_{(i)})|^2$ is minimal is considered to be anomalous. If the weighted sum of residuals squares in the process of eliminating the anomalous equation exceeds the threshold $|\delta\bar{y}_{(i)}|^2 > \chi_{1-\alpha}^2(m-1-n)$, then repeat the procedure for observations $$y_{(i)} = H_{(i)}x + \zeta_{(i)}. \qquad (E30)$$

The searching procedure described above is very time consuming because it requires solving the LSM task for each observation model. It utilizes approximately $O((n^2 \cdot m + n^3/3)$ m) flops. Since m is large, there are $O(n^2 m^2)$ flops. A faster scheme for estimating and obtaining weighted sums of residuals squares is described below. It utilizes $O(n^2 m)$ flops; therefore, it is m times smaller. This is substantial for GNSS, where m can be 20 or greater. This approach reduces processor load substantially and yields the same result. For simplicity, assume that the covariance matrix of the observation noise is diagonal. The process of elimination used for the original observation model is followed. This scheme is effective for applications in addition to GNSS. One skilled in the art can apply the method expanded for any observation model represented by (E28).

The LSM estimate of the state vector for the whole set of observation equations is equal to $$\hat{x} = [\hat{D}]^{-1}\hat{d}, \qquad (E31)$$

where $$\hat{D} = \bar{H}^T\bar{H}$$
$$\hat{d} = \bar{H}^T\bar{y}.$$

The weighted sum of residuals squares is then:

$$|\delta\bar{y}(\hat{x})|^2 = |\bar{y} - \bar{H}\hat{x}|^2. \qquad (E32)$$

When the i-th measurement is eliminated, the estimate $\hat{x}_{(i)}$ is obtained. To express it through the estimated $\hat{x}_{(i)}$ and eliminated measurement $y_i$, designate $h_{(i)} = \bar{H}_{[i],[:]}$. The peer-to-peer information coordinates updates are:

$$\hat{D}_{(i)} := \hat{D} - [h_{(i)}]^T[h_{(i)}]$$

$$\hat{d}_{(i)} := \hat{d} - [h_{(i)}]^T[\bar{y}]_i. \qquad (E33)$$

Therefore:

$$\hat{x}_{(i)} = \hat{D}_{(i)}^{-1}\hat{d}_{(i)} \quad (E34)$$
$$= (\hat{D} - h_{(i)}^T h_{(i)})^{-1}(\hat{d} - h_{(i)}^T [\bar{y}]_i)$$
$$= (\hat{D}^{-1} + c_{(i)}w_{(i)}w_{(i)}^T)(\hat{d} - h_{(i)}^T [\bar{y}]_i),$$

where $$w_{(i)} = \hat{D}^{-1}[h_{(i)}]^T \quad (E35)$$
$$c_{(i)} = \frac{1}{1 - k_{(i)}}$$
$$k_{(i)} = h_{(i)}w_{(i)}.$$

Multiplying the matrices in (E34), and substituting the values in (E35), yields peer-to-peer state vector update:

$$\hat{x}_{(i)} = \hat{x} - c_{(i)}w_{(i)}([\bar{y}]_i - h_{(i)}\hat{x}). \quad (E36)$$

The weighted sum of residuals squares peer-to-peer update for the eliminated i–th equation is then:

$$|\delta\bar{y}_{(i)}(\hat{x}_{(i)})|^2 = \sum_{j=1, j\neq i}^{m}([\bar{y}]_j - \overline{H}_{[j],[:]}\hat{x}_{(i)})^2 \quad (E37)$$
$$= \sum_{j=1}^{m}([\bar{y}]_j - \overline{H}_{[j],[:]}\hat{x}_{(i)})^2 - ([\bar{y}]_i - \overline{H}_{[i],[:]}\hat{x}_{(i)})^2$$
$$= |\bar{y} - \overline{H}\hat{x}_{(i)}|^2 - ([\bar{y}]_i - h_{(i)}\hat{x}_{(i)})^2.$$

(E37) can be simplified as:

$$|\bar{y} - \overline{H}\hat{x}_{(i)}|^2 = |\bar{y} - \overline{H}\hat{x}|^2 + |\overline{H}w_{(i)}|^2 c_{(i)}^2 ([\bar{y}]_i - h_{(i)}\hat{x})^2 \quad (E38)$$
$$= |\delta\bar{y}(\hat{x})|^2 + k_{(i)}c_{(i)}^2 ([\bar{y}]_i - h_{(i)}\hat{x})^2.$$

This follows from:

$$|\overline{H}w_{(i)}|^2 = w_{(i)}^T \overline{H}^T \overline{H} w_{(i)}$$
$$= w_{(i)}^T \hat{D} w_{(i)}$$
$$= h_{(i)} \hat{D}^{-1} \hat{D} w_{(i)}$$
$$= h_{(i)} w_{(i)}$$
$$= k_{(i)}$$

and $$\overline{H}^T(\bar{y} - \overline{H}\hat{x}) = 0.$$

Using $$1 + c_{(i)}k_{(i)} = 1 + \frac{1}{1 - k_{(i)}}k_{(i)}$$
$$= \frac{1}{1 - k_{(i)}}$$
$$= c_{(i)},$$

then calculate:

$$[\bar{y}]_i - h_{(i)}\hat{x}_{(i)} = [\bar{y}]_i - h_{(i)}(\hat{x} - c_{(i)}w_{(i)}([\bar{y}]_i - h_{(i)}\hat{x})) \quad (E39)$$
$$= ([\bar{y}]_i - h_{(i)}\hat{x}) + c_{(i)}h_{(i)}w_{(i)}([\bar{y}]_i - h_{(i)}\hat{x})$$
$$= c_{(i)}([\bar{y}]_i - h_{(i)}\hat{x}).$$

After all these transformations have been performed, the weighted sum of residuals squares when the i–th equation is eliminated is:

$$|\delta\bar{y}_{(i)}(\hat{x})|^2 = |\delta\bar{y}(\hat{x})|^2 + k_{(i)}c_{(i)}^2 ([\bar{y}]_i - h_{(i)}\hat{x})^2 - c_{(i)}^2 ([\bar{y}]_i - h_{(i)}\hat{x})^2 \quad (E40)$$
$$= |\delta\bar{y}(\hat{x})|^2 + c_{(i)}([\bar{y}]_i - h_{(i)}\hat{x})^2.$$

Therefore, minimization of the weighted sum of residuals squares is equivalent to maximization of values $c_{(i)}([\bar{y}]_i - h_{(i)}\hat{x})^2$. Since the residual is equal to $$\delta\bar{y}_i(\hat{x}) = [\bar{y}]_i - \overline{H}_{[i],[:]}\hat{x} \quad (E41)$$
$$= [\bar{y}]_i - h_{[i]}\hat{x},$$

the searching algorithm differs from selecting the absolute maximal residual in having the extra weight multiplier $c_{(i)}$, which was determined in (E35).

The searching procedure for one anomaly in information coordinates can be described by the following pseudo-code:

```
[i_min,V_min,c_min,w_min]:=BadMeasSearch(H̄, δȳ, &P, &x)      (E42)
    H̄∈ M_{m×n}(ℝ), δȳ∈ M_{m×1}(ℝ), P∈ M_{n×n}(ℝ), x∈ M_{n×1}(ℝ)
{
    V_min := 0;
    w_min := 0_{n×1};
    c_min := 0;
    i_min := −1;
    if(m ≤ n)
            return;
    for(i := [1 : m])
    {
        w := P · [H_{i,[:]}]^T;
        k := H_{i,[:]} · w;
        if (k ≥ 1)
            error('Lost Positive Definiteness');
        c := (1 − k)^{−1};
        V := c · ([δy]_i)^2;
        if (V < V_min)
        {
            V_min :=V;
            i_min :=i;
            w_min :=w;
            c_min :=c;
        }
    }
}
```

The symbol & in front of an argument variable indicates that the argument variable is an input/output variable. The value of this variable can be changed in the procedure. One skilled in the art can convert the pseudo-code to computer-executable code.

The algorithm for removing information about an anomaly (fast recalculation of estimates and WSRS after an anomalous measurement has been excluded) can be expressed by the following pseudo-code:

```
RemoveBadMeas(&H̄, &δȳ,&P.&SumRes,(i_min,V_min,c_min,w_min));    (E43)
{
    P := P −c_min · w_min · w^T_min;
    x := x −c_min· w_min· [δȳ]_i_min;
    SumRes:=SumRes − V_min ;
    H̄.DeleteRow(i_min);
    ȳ.DeleteRow(i_min);
    δȳ.DeleteRow(i_min);
}
```

One skilled in the art can convert the pseudo-code to computer-executable code. The whole problem (testing measurements for consistency, detecting anomalous measurements, removing anomalous measurements, and iterating the procedure for the remaining measurements) can be solved with the procedure expressed by the following pseudo-code:

```
LSM.Run(&H̄, &ȳ)                                                 (E44)
{
    D̂ := H̄^T H̄;
    d̂ := H̄^T ȳ;
    P̂ := D̂^−1;
    x̂ := P̂ · d̂;
    δȳ := ȳ − H̄x̂;
    SumRes := δȳ^T · δȳ;
    while(SumRes ≥ chi2inv(y.numRow − x.numRow,1 − α))
    {
        [i,V,c,w]:=BadMeasSearch(H̄, δȳ, &P̂, &x̂);
        if (i == −1)
            return with no solution available;
        RemoveBadMeas(&H̄, &δȳ,&P̂,&SumRes,(i,V,c,w));
    }
}
```

One skilled in the art can convert the pseudo-code to computer-executable code.

The discussion above considered LSM in the form of normal equations. In an embodiment, LSM is used with Cholesky's estimate of information coordinates. A Cholesky information matrix (CIM) can be represented by $D=S^T S$, where S is an upper triangular matrix. The vector $s=S\cdot x$ (where x represents a state vector) is called a Cholesky information vector (CIV). The set $\{S,s\}$ is called Cholesky information coordinates (CIC).

LSM used with Cholesky's estimate of information coordinates yields:

$$k_{(i)} = h_{(i)} w_{(i)} \quad (E45)$$

$$= h_{(i)} \hat{D}^{-1} h_{(i)}^T$$

$$= h_{(i)} [\hat{S}^T \hat{S}]^{-1} h_{(i)}^T$$

$$= h_{(i)} \hat{S}^{-1} \hat{S}^{-T} h_{(i)}^T$$

$$= |v_{(i)}|^2,$$

where $v_{(i)} = \hat{S}^{-T} h_{(i)}^T$. Calculation of $k_{(i)}$ requires about $0.5\ n^2$ flops when calculation procedures with normal equations or Cholesky information coordinates are used. Note that the fast searching procedure works for a linear case. For a non-linear observation model, some iteration for each eliminated equation i can be done. In the case considered above, the non-linearity is weak, and iterations are not needed.

Ambiguities Resolution.

In the positioning task described above, ambiguities were assumed to have been resolved. Carrier phase single differences, however, are accurate but ambiguous measurements. By transforming carrier phase single differences into unambiguous measurements, a position estimate to an accuracy on the order of 1 cm can be obtained. This estimate can be obtained by the maximum likelihood technique. The solution can be divided into two steps. In the first step, float ambiguities are determined. Various methods, such as a Kalman filter or a recursive LSM, can be used for this step. In the second step, using integer calculations, fixed ambiguities are resolved.

Observation Equations and State Vector for Ambiguities Resolution.

Refer back to (E8) and (E9). Assume that variables of the first row change independently both in time and relative to each other. Combining equations (E8) and (E9) in a manner similar to treating double differences, eliminate these values from consideration. Combined equations go to the filter input. Only coordinates, double differences of ambiguities, and double differences of ionosphere errors are determined in the filter. Integer resolution is made for the filtered set of float ambiguities $\{\nabla^{s,s_{ref}} N^f\}_{f, s \neq s_{ref}}$. Filters are described in more detail below.

Inverse Problem.

Assume that the baseline (the distance between the base and the rover) is short and that the rover coordinates are known. Then integer resolution can be simplified. Using code measurements, estimate $\Gamma_k^f$. Assume that the estimate has an associated error q. Subtract known ranges and $\Gamma_k^f$ from phase measurements and form double differences from the obtained values:

$$\nabla^{s,s_{ref}} \frac{(\varphi_k^{f,s} - c\tau_k + \Gamma_k^f - R_{0,k}^s)}{\lambda^{f,s}} = \qquad (E46)$$

$$\nabla^{s,s_{ref}} N^f + \tilde{q}^f \nabla^{s,s_{ref}} l^s + \nabla^{s,s_{ref}} \frac{\xi_k^{(\varphi)f,s}}{\lambda^{f,s}}.$$

The value $\tilde{q}^f \nabla^{s,s_{ref}} l^s$ is formed from the double differences $$\nabla^{s,s_{ref}} \frac{q}{\lambda^{f,s}},$$

via the following equation:

$$\nabla^{s,s_{ref}} \frac{q}{\lambda^{f,s}} = \nabla^{s,s_{ref}} \frac{1 + \varepsilon_0^{SYS} l^s}{\lambda_0^f} q \qquad (E47)$$

$$= \frac{\varepsilon_0^{SYS}}{\lambda_0^f} q \nabla^{s,s_{ref}} l^s$$

$$= \tilde{q}^f \cdot \nabla^{s,s_{ref}} l^s.$$

Considering the typical accuracy of code measurements, the absolute value of q can be assumed to be less than or equal to ~10 m. Therefore, the absolute value of $$\tilde{q}^f = \frac{\varepsilon_0^{SYS}}{\lambda_0^f} q$$

is less than one hundredth of a cycle and can be neglected. Since the phase error is much less than a cycle, estimates of double differences of integer ambiguities can be obtained by rounding off values in the left-hand side. The value $$\left| \tilde{q}^f \nabla^{s,s_{ref}} l^s + \nabla^{s,s_{ref}} \frac{\zeta_k^{(\varphi)f,s}}{\lambda^{f,s}} \right|$$

is less then 0.5 cycle. So rounding of (E46) leads to the equation:

$$\nabla^{s,s_{ref}} N^f = \text{ROUND}\left[ \nabla^{s,s_{ref}} \frac{(\varphi_k^{f,s} - c\tau_k + \Gamma_k^f - R_{0,k}^s)}{\lambda^{f,s}} \right]. \quad (E48)$$

After the integers $\nabla^{s,s_{ref}} N^f$ have been obtained, the value $\Psi_k^f$ can be determined as well. Note that $\Gamma_k^f$ does not need to be eliminated for GPS and GAL measurements, since it is cancelled in the single differences. It can be compensated, however, if a correct estimate of the value $\Psi_k^f$ is needed. For GPS and GAL, values $\Gamma_k^f$ and $\Psi_k^f$ cannot be estimated using only phase measurements. For this purpose, $\Gamma_k^f$ is estimated via code measurements.

Ambiguities Resolution Flowchart.

Figure 2:
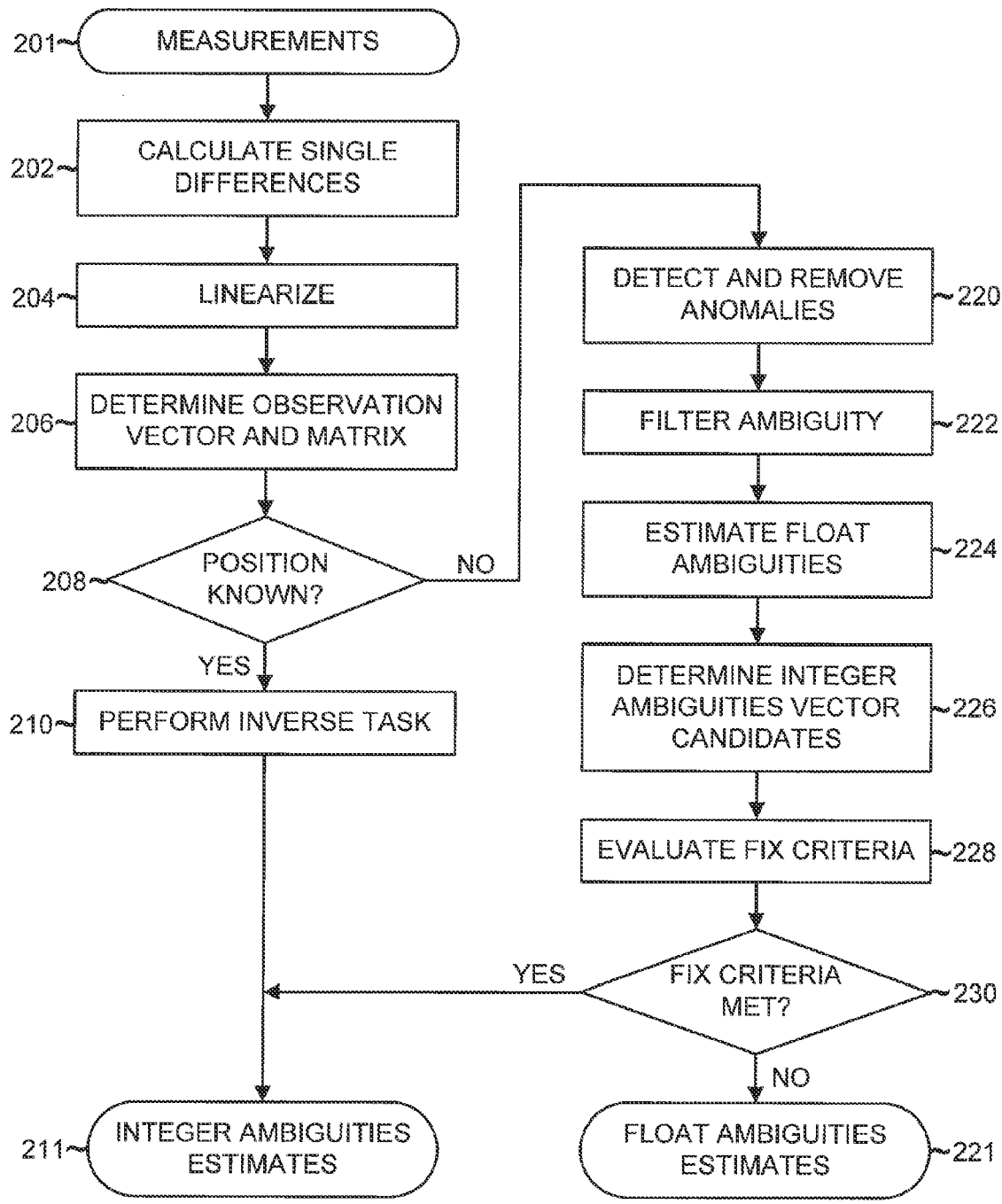
FIG. 2 shows a flowchart of a method for resolving integer ambiguities.

FIG. 2 shows a flowchart of steps for resolving ambiguities. [Here it is assumed that there are no GLONASS biases due to receivers of different characteristics (for examples, receivers from different manufacturers) being installed in the rover and in the base.] Measurements 201 include pseudo-ranges and carrier phases measured at the base navigation receiver and at the rover navigation receiver. In step 202, single differences of the measurements measured at the rover navigation receiver and the corresponding measurements measured at the base navigation receiver are calculated. The process then passes to step 204, in which the single differences are linearized. The process then passes to step 206, in which an observation vector and matrix are determined from the linearized single differences. The process then passes to decision step 208. If an estimate of the rover position is known, then the process passes to step 210, in which an inverse task is performed to generate integer ambiguities estimates 211. The rover position, for example, can be extrapolated from a previously known position via single differences of carrier phase increments.

In step 208, if an estimate of the rover position is not known, then the process passes to step 220, in which anomalous measurements, based on single differences of pseudo-ranges and single differences of carrier phase increments, are detected and removed. The process then passes to step 222, in which the ambiguities are filtered. Details of step 222 are described in further detail below. The process then passes to step 224, in which float ambiguities are estimated. Further details of estimating the float ambiguities are given below. Briefly, the vector of float ambiguities is a sub-vector of the state vector; therefore, the float ambiguities are estimated during the filtering of the state vector.

The process then passes to step 226, in which an integer ambiguities vector candidate is determined. Integer resolution is based on the MLAMBDA method (see below). The following integer minimization of quad form is determined:

$$q = (N - \tilde{N})^T D (N - \tilde{N}) \to \min,$$

where N is an integer ambiguities vector, $\tilde{N}$ is the float ambiguities vector estimated in the filter, and D is the information matrix for the float ambiguities vector estimate. Two minima $q_1 \leq q_2$ (where $q_1$ is the first minimum and $q_2$ is the second minimum after the first) and the corresponding integer ambiguities vectors $N_1$, $N_2$ are determined. The integer ambiguity vector $N_1$ is selected to be an integer ambiguities vector candidate.

The process then passes to step 228, in which fix criteria are evaluated for the integer ambiguities vector candidate. Herein, a fix process refers to the process of determining an integer ambiguity vector from a floating ambiguity vector. There is a probability that the fix process determines an incorrect integer ambiguity vector ("wrong fix"). Fix criteria correspond to the probability of a wrong fix. In an embodiment, fix criteria are based on the contrast ratio, which is defined from the LAMBDA (or modifications of the LAMBDA) algorithm output. [For details of LAMBDA and modifications of LAMBDA, see X.-W. Chang, X. Yang, and T. Zhou, "MLAMBDA: A modified LAMBDA method for integer least-squares estimation", Journal of Geodesy, Volume 79, Issue 9, pp 552-565, December, 2005, which is herein incorporated by reference.] As the contrast ratio increases, the probability of a wrong fix decreases.

The outputs of the LAMBDA algorithm are integer ambiguity vectors and quadratic form values. The contrast ratio (the ratio of the second smallest quadratic form value to the first smallest one), $C = q_2/q_1$, is calculated and compared to a user-defined threshold T (which depends on the number of ambiguities present in vector). If $C \geq T$, a fix is attained [that is, a specific integer ambiguity vector is determined with a user-defined minimum probability of being correct], and $\hat{N} = N_1$ is designated to be an estimate of the integer ambiguities vector. If the contrast ratio is lower than the threshold value, then filtration is continued to obtain a higher contrast ratio.

The process then passes to decision step 230. If the fix criteria are met, then the process yields integer ambiguities estimates 211. If the fix criteria are not met, then the process yields float ambiguities estimates 221. Integer ambiguities estimates 211 and float ambiguities estimates 221 can then be used in the calculation of unambiguous phases, with integer ambiguities estimates providing more precise results than float ambiguities estimates. In an embodiment, the unambiguous phases are provided as measurements 101 in FIG. 1.

For static and kinematic modes, the same overall method can be used. Details of step 222, filter ambiguity, differ, however. Different methods can be used to implement each of the steps. Some are described below.

Computational Sequence of Ambiguities Resolution.

To filter ambiguities, a Kalman filter with estimating Cholesky information coordinates, referred to herein as a Cholesky information Kalman filter (CIKF), is used in an embodiment. Only coordinates and double differences of ambiguities are estimated. The remaining values are eliminated in the process of taking double differences. The coordinates and double differences of ambiguities are included in the state vector for the ambiguity estimation task in the form:

$$x = \left[ r, \left( \nabla^{s,s_{ref}^1} \Delta_{0,1} N^1 \right)_{s \neq s_{ref}^1}, K, \left( \nabla^{s,s_{ref}^{NF}} \Delta_{0,1} N^{NF} \right)_{s \neq s_{ref}^{NF}} \right]. \quad (E49)$$

Only those ambiguities in each frequency that can be defined from the observation equation are used. Therefore, the ambiguity sub-vector size in (E49) changes under certain circumstances: when phase measurements are being tracked, when phase measurements lose tracking, and when phase measurements are deleted by anomaly detectors. An important consideration is consistency in variable sequencing in the state vector from one epoch to another. Formally, different reference satellites $s_{ref}^f$ are chosen for each frequency since a reference measurement for a particular frequency band can be removed by the anomaly detector.

In embodiments of the invention, methods for ambiguity resolution analyze the current state of the satellite constellation during the transition from one epoch to another epoch. The scenarios taken into account include:

- A reference satellite changes. The state vector and corresponding Cholesky information coordinates (CICs) are recalculated.
- A satellite (non-reference) rises (appears). Corresponding ambiguities are introduced into the state vector.
- A satellite (non-reference) sets (disappears). Corresponding ambiguities from the state vector are removed.

A satellite rises (or appears) when it enters the line-of-sight of a receiver; that is, the receiver starts receiving signals from a satellite from which it previously did not receive signals. A satellite sets (or disappears) when it leaves the line-of-sight of a receiver; that is, the receiver stops receiving signals from a satellite from which it previously did receive signals. A stable solution is maintained during various changes in the state of the satellite constellation. Information is retained under various scenarios. In previous procedures, information is lost, and calculations (filter CICs) need to be re-initialized, consuming computational resources. For example, if a reference satellite is changed, the whole filter is reset. A great amount of information is lost. Similar results occur when a satellite appears or disappears. In an embodiment, an algorithm for recalculation of CICs is used to retain previously acquired information.

Cholesky information coordinates are divided into blocks, as shown in FIG. 3 (E50). At the next epoch, if the constellation remains the same, the CICs change as shown in FIG. 4 (E51). Here $\beta \in [0;1]$ is the coordinate aging coefficient, and $\alpha \in [0;1]$ is the ambiguity aging coefficient. The ambiguity aging coefficient is used to model degradation of estimate accuracy during periods when no measurements are received. (Also, it provides a mechanism to prevent floating number overflow during program execution.) At $\beta=0$, coordinates change independently from epoch to epoch. At $\beta=1$ coordinates do not age (this occurs when the rover is static).

Correction is made according to linearized double differences of code and phase observations. The matrix of the linearized observation model for double differences is:

$$\begin{bmatrix} \overline{H}_{DD}^{(\rho)1} & 0 & 0 & L & 0 & 0 & \overline{y}_{DD}^{(\rho)1} \\ M & M & M & O & M & M & M \\ \overline{H}_{DD}^{(\rho)NF} & 0 & 0 & L & 0 & 0 & \overline{y}_{DD}^{(\rho)NF} \\ \overline{H}_{DD}^{(\varphi)1} & \overline{A}_{DD}^{(\varphi)1} & 0 & L & 0 & 0 & \overline{y}_{DD}^{(\varphi)1} \\ \overline{H}_{DD}^{(\varphi)2} & 0 & \overline{A}_{DD}^{(\varphi)2} & L & 0 & 0 & \overline{y}_{DD}^{(\varphi)2} \\ M & M & M & O & M & M & M \\ \overline{H}_{DD}^{(\varphi)NF-1} & 0 & 0 & L & \overline{A}_{DD}^{(\varphi)NF-1} & 0 & \overline{y}_{DD}^{(\varphi)NF-1} \\ \overline{H}_{DD}^{(\varphi)NF} & 0 & 0 & L & 0 & \overline{A}_{DD}^{(\varphi)NF} & \overline{y}_{DD}^{(\varphi)NF} \end{bmatrix} \quad (E52)$$

A procedure for updating information coordinates is used in accordance with the observation model, except for preliminary processing of the block for code observations. The matrix has a high number of zeros in block rows corresponding to code observations; therefore, processing of zeros can be reduced. The following matrix comes at the input of the updating algorithm for CIKF:

$$[\overline{H} | \overline{y}] = \begin{bmatrix} S_{DD}^{(\rho)} & 0 & 0 & L & 0 & 0 & s_{DD}^{(\rho)} \\ \overline{H}_{DD}^{(\varphi)1} & \overline{A}_{DD}^{(\varphi)1} & 0 & L & 0 & 0 & \overline{y}_{DD}^{(\varphi)1} \\ \overline{H}_{DD}^{(\varphi)2} & 0 & \overline{A}_{DD}^{(\varphi)2} & L & 0 & 0 & \overline{y}_{DD}^{(\varphi)2} \\ M & M & M & O & M & M & M \\ \overline{H}_{DD}^{(\varphi)NF-1} & 0 & 0 & L & \overline{A}_{DD}^{(\varphi)NF-1} & 0 & \overline{y}_{DD}^{(\varphi)NF-1} \\ \overline{H}_{DD}^{(\varphi)NF} & 0 & 0 & L & 0 & \overline{A}_{DD}^{(\varphi)NF} & \overline{y}_{DD}^{(\varphi)NF} \end{bmatrix} \quad (E53)$$

where $S_{DD}^{(\rho)}$, $s_{DD}^{(\rho)}$ are the Cholesky information coordinates for the rover positions obtained from pseudo-orange double differences according to the following computational scheme:

$$[\overline{H}_{DD}^{(\rho)} | \overline{y}_{DD}^{(\rho)}] = \begin{bmatrix} \overline{H}_{DD}^{(\rho)1} & \overline{y}_{DD}^{(\rho)1} \\ M & M \\ \overline{H}_{DD}^{(\rho)NF} & \overline{y}_{DD}^{(\rho)NF} \end{bmatrix} \xrightarrow{QR} \begin{bmatrix} S_{DD}^{(\rho)} & s_{DD}^{(\rho)} \\ 0 & \overline{r}_{DD}^{(\rho)} \end{bmatrix}. \quad (E54)$$

QR transformation is discussed in Lawson and in Golub. Briefly, QR decomposition of matrix A is A=Q·R where Q is orthogonal and R is upper triangular. The QR-transformation of system [A|y] results in the system [R|Q^T y].

Updating filter matrices is implemented by the following procedure:

$$\begin{bmatrix} \tilde{S}^x & \tilde{s}^x \\ \overline{H} & \overline{y} \end{bmatrix} \xrightarrow{QR} \begin{bmatrix} \hat{S}^x & \hat{s}^x \\ 0 & \hat{r} \end{bmatrix}. \quad (E55)$$

Here the symbol $\square$ refers to predicted values, and the symbol $\wedge$ refers to updated values.

Generating Double Differences for Ambiguity Filter.

Refer back to (E8) and (E9). An expanded matrix for this set of equations is:

$$\begin{bmatrix} \overline{w}^{(\varphi)f} & 0_{NS \times 1} & \overline{H}_{cos}^{(\varphi)f} & 0_{NS \times NS-1} & \overline{y}^{(\varphi)f} \\ \overline{w}^{(\varphi)f} & \overline{\lambda}^{(\varphi)f} & \overline{H}_{cos}^{(\varphi)f} & \overline{A}^{(\varphi)f} & \overline{y}^{(\varphi)f} \end{bmatrix}. \quad (E56)$$

In this representation, the carrier phase equations in the first equation would correspond to the reference satellite, and a matrix shown below is introduced:

$$\overline{A}^{(\varphi)f} = \begin{bmatrix} 0_{1 \times NS-1} \\ \text{diag}(\overline{w}^{(\varphi)f}) \end{bmatrix}. \quad (E57)$$

First consider the block row, which corresponds to code equations, similar to equations (E12):

$$\begin{bmatrix} C_{\tau,\tau}^{(\rho)f} & 0 & C_{\tau,r}^{(\rho)f} & 0_{1\times NS-1} \\ 0 & 0_{NS-1\times 1} & H_{DD}^{(\rho)f} & 0_{NS-1\times NS-1} \\ \overline{w}^{(\varphi)f} & \overline{\lambda}^{(\varphi)f} & H_{cos}^{(\varphi)f} & \overline{A}^{(\varphi)f} \end{bmatrix} \begin{bmatrix} c_{\tau}^{(\rho)f} \\ \overline{y}_{DD}^{(\rho)f} \\ \overline{y}^{(\varphi)f} \end{bmatrix}. \quad (E58)$$

Apply a Householder's transformation that resets all the elements of column $\overline{w}^{(\varphi)f}$, excluding the first one:

$$\begin{bmatrix} C_{\tau,\tau}^{(\rho)f} & 0 & C_{\tau,r}^{(\rho)f} & 0_{1\times NS-1} \\ 0_{NS-1\times 1} & 0_{NS-1\times 1} & H_{DD}^{(\rho)f} & 0_{NS-1\times NS-1} \\ C_{\tau,\tau}^{(\varphi)f} & C_{\tau,\psi}^{(\varphi)f} & C_{\tau,r}^{(\varphi)f} & C_{\tau,N}^{(\varphi)f} \\ 0_{NS-1\times 1} & \overline{\lambda}_{(0)}^{(\varphi)f} & H_{(0)}^{(\varphi)f} & \overline{A}_{(0)}^{(\varphi)f} \end{bmatrix} \begin{bmatrix} c_{\tau}^{(\rho)f} \\ \overline{y}_{DD}^{(\rho)f} \\ c_{(0)\tau}^{(\varphi)f} \\ \overline{y}_{(0)}^{(\varphi)f} \end{bmatrix}. \quad (E59)$$

Then apply a Givens rotation [see Lawson] to reset element $C_{\tau,\tau}^{(\varphi)f}$:

$$\begin{bmatrix} C_{(0)\tau,\tau}^{(\rho)f} & 0 & C_{(0)\tau,r}^{(\rho)f} & C_{(0)\tau,N}^{(\rho)f} \\ 0_{NS-1\times 1} & 0_{NS-1\times 1} & H_{DD}^{(\rho)f} & 0_{NS-1\times NS-1} \\ 0 & C_{(0)\tau,\psi}^{(\varphi)f} & C_{(0)\tau,r}^{(\varphi)f} & C_{(0)\tau,N}^{(\varphi)f} \\ 0_{NS-1\times 1} & \overline{\lambda}_{(0)}^{(\varphi)f} & H_{(0)}^{(\varphi)f} & \overline{A}_{(0)}^{(\varphi)f} \end{bmatrix} \begin{bmatrix} c_{(0)\tau}^{(\rho)f} \\ \overline{y}_{DD}^{(\rho)f} \\ c_{(0)\tau}^{(\varphi)f} \\ \overline{y}_{(0)}^{(\varphi)f} \end{bmatrix}. \quad (E60)$$

Again, apply a Householder's transformation to zero out all the column elements $$\begin{bmatrix} C_{(0)\tau,\psi}^{(\varphi)f} \\ \overline{\lambda}_{(0)}^{(\varphi)f} \end{bmatrix},$$

excluding the first:

$$\begin{bmatrix} C_{(0)\tau,\tau}^{(\rho)f} & 0 & C_{(0)\tau,r}^{(\rho)f} & C_{(0)\tau,N}^{(\rho)f} \\ 0_{NS-1\times 1} & 0_{NS-1\times 1} & H_{DD}^{(\rho)f} & 0_{NS-1\times NS-1} \\ 0 & C_{(1)\psi,\psi}^{(\varphi)f} & C_{(1)\psi,r}^{(\varphi)f} & C_{(1)\psi,N}^{(\varphi)f} \\ 0_{NS-1\times 1} & 0_{NS-1\times 1} & H_{(1)}^{(\varphi)f} & \overline{A}_{(1)}^{(\varphi)f} \end{bmatrix} \begin{bmatrix} c_{(0)\tau}^{(\rho)f} \\ \overline{y}_{DD}^{(\rho)f} \\ c_{(1)\psi}^{(\varphi)f} \\ \overline{y}_{(1)}^{(\varphi)f} \end{bmatrix}. \quad (E61)$$

Now rearrange the rows to obtain the matrix $$\begin{bmatrix} C_{(0)\tau,\tau}^{(\rho)f} & 0 & C_{(0)\tau,r}^{(\rho)f} & C_{(0)\tau,N}^{(\rho)f} \\ 0 & C_{(1)\psi,\psi}^{(\varphi)f} & C_{(1)\psi,r}^{(\varphi)f} & C_{(1)\psi,N}^{(\varphi)f} \\ \hline 0_{NS-1\times 1} & 0_{NS-1\times 1} & H_{DD}^{(\rho)f} & 0_{NS-1\times NS-1} \\ 0_{NS-1\times 1} & 0_{NS-1\times 1} & H_{DD}^{(\varphi)f} & \overline{A}_{DD}^{(\varphi)f} \end{bmatrix} \begin{bmatrix} c_{(0)\tau}^{(\rho)f} \\ c_{(1)\psi}^{(\varphi)f} \\ \overline{y}_{DD}^{(\rho)f} \\ \overline{y}_{DD}^{(\varphi)f} \end{bmatrix}. \quad (E62)$$

For estimating ambiguities double differences, the following block is of interest:

$$\begin{bmatrix} \overline{H}_{DD}^{(\rho)f} & 0_{NS-1\times NS-1} \\ \overline{H}_{DD}^{(\varphi)f} & \overline{A}_{DD}^{(\varphi)f} \end{bmatrix} \begin{bmatrix} \overline{y}_{DD}^{(\rho)f} \\ \overline{y}_{DD}^{(\varphi)f} \end{bmatrix}. \quad (E63)$$

Thus arranging the observation matrix in all frequencies for the ambiguity filter yields the following full matrix:

$$\begin{bmatrix} \overline{H}_{DD}^{(\rho)1} & 0 & 0 & L & 0 & 0 \\ M & M & M & O & M & M \\ \overline{H}_{DD}^{(\rho)NF} & 0 & 0 & L & 0 & 0 \\ \overline{H}_{DD}^{(\varphi)1} & \overline{A}_{DD}^{(\varphi)1} & 0 & L & 0 & 0 \\ \overline{H}_{DD}^{(\varphi)2} & 0 & \overline{A}_{DD}^{(\varphi)2} & L & 0 & 0 \\ M & M & M & O & M & M \\ \overline{H}_{DD}^{(\varphi)NF-1} & 0 & 0 & L & \overline{A}_{DD}^{(\varphi)NF-1} & 0 \\ \overline{H}_{DD}^{(\varphi)NF} & 0 & 0 & L & 0 & \overline{A}_{DD}^{(\varphi)NF} \end{bmatrix} \begin{bmatrix} \overline{y}_{DD}^{(\rho)1} \\ M \\ \overline{y}_{DD}^{(\rho)NF} \\ \overline{y}_{DD}^{(\varphi)1} \\ \overline{y}_{DD}^{(\varphi)2} \\ M \\ \overline{y}_{DD}^{(\varphi)NF-1} \\ \overline{y}_{DD}^{(\varphi)NF} \end{bmatrix}. \quad (E64)$$

This matrix is the same as the one previously calculated as in (E52).

State Vector Updating.

An updating algorithm for CIC according to computational procedure (CI-LSM) is described. At the algorithm input in matrices $S \in M_{n\times n}(\mathbb{R})$, $s \in M_{n\times 1}(\mathbb{R})$, a priori values of CIC ($\tilde{S}^x$, $\tilde{s}^x$) are set. Matrices $\overline{H} \in M_{m\times n}(\mathbb{R})$, $\overline{y} \in M_{m\times 1}(\mathbb{R})$ are the matrices of the observation model and observation vector with normalized noise. All input matrices are re-calculated in processing the algorithm. At the output in matrices S,s, there are updated CIC ($\hat{S}^x$, $\hat{s}^x$), and matrix $\overline{H}$ is reset, while in vector $\overline{y}$ there are weighted residuals. The updating algorithm yields matrix $\hat{S}^x$ as the upper triangular matrix. Pseudo-code for the updating algorithm is shown in FIG. 5 (E65). Obtaining estimate $\hat{x}$ is implemented with the help of the procedure of backward substitution [see Golub]. Values $\hat{x}$ are obtained in vector s. The matrix procedure "A.dotCol(i,[B,]j)" returns the dot product of columns as follows: $A_{:,i}^T \cdot B_{:,j}$. The matrix procedure "A.saxpyCol(i,t,[B, j=1])" rewrites the columns of A as follows: $A_{:,i} := A_{:,i} + t \cdot B_{:,j}$. If B≡A then B is omitted as follows: "A.dotCol(i, j)" and "A.saxpyCol(i,t, j)". When the number of columns of B is 1, the argument "j" is omitted in "saxpyCol". One skilled in the art can convert the pseudo-code to computer-executable code.

Changing Reference Satellite.

Assume that according to frequency variables $f$ a new reference satellite has been selected with number $j \equiv s_{ref,k}^f$. Old variables (for reference satellite $r \equiv s_{ref,k-1}^f$) are expressed using new ones (reference satellite j) according to:

$$M^{f,r} = M^{f,j} + \nabla^{r,j} N^f$$

$$\nabla^{s,r} N^f = \nabla^{s,j} N^f - \nabla^{r,j} N^f$$

$$(\nabla^{s,s} N^f \equiv 0 \forall s). \quad (E66)$$

When processing double differences, substitution of phase offsets does not affect the task, since the phase offsets are eliminated in double differences; hence, only ambiguities double differences are important. In matrix form, the ambiguities vector for frequency $f$ changes according to the rule:

$$(\nabla^{s,r} N^f)_{s \neq r} = A^f \cdot (\nabla^{s,j} N^f)_{s \neq j} \quad (E67)$$

$$A^f = \begin{bmatrix} Id_{j-1} & -1_{j-1 \times 1} & 0_{j-1 \times n-j-1} \\ 0_{1 \times j-1} & -1 & 0_{1 \times n-j-1} \\ 0_{n-j-1 \times j-1} & -1_{n-j-1 \times 1} & Id_{n-j-1} \end{bmatrix}.$$

Here $a_{p \times q}$ represents the matrix of the corresponding dimension, all the elements of which are equal to a; and n is the number of ambiguities on frequency f.

New variables are expressed through old ones in a similar way $$M^{f,j} = M^{f,r} - \nabla^{r,j} N^f$$

$$\nabla^{s,j} N^f = \nabla^{s,r} N^f + \nabla^{r,j} N^f$$

$$(\nabla^{s,s} N^f = \forall s). \quad (E68)$$

Note that $$(\nabla^{s,j} N)_{s \neq j} = A^f \cdot (\nabla^{s,r} N)_{s \neq r} \quad (E69)$$

with the above-mentioned substitution matrix $A^f$. For the whole state vector:

$$x_{old} = A x_{new},$$

$$A = \text{diag}(Id_3, A^1, K, A^{NF}). \quad (E70)$$

To re-calculate CIC elements $S^x$, $s^x$, note that $S_{old}^x x_{old} = s_{old}^x$; hence $(S_{old}^x A) x_{new} = s_{old}^x$. Therefore, $S_{new}^x x_{new} = s_{new}^x$. Matrix $[S_{new}^x | s_{new}^x]$ is derived from $[S_{old}^x A | s_{old}^x]$ after its reduction to the upper triangular form using the QR-transformation. Matrix $S_{old}^x A$ has the following structure shown in FIG. 6 (E71).

Blocks $S_{[N^f],[N^f]} A^f$ are computed considering the structure of matrices $A^f$ and $S_{[N^f],[N^f]}$. The product of right multiplication for an arbitrary matrix M by matrix $A^f$, determined previously, differs from M only in that j-th column equal to $-M_1^r$. For matrix $M = [M_1, \ldots, M_j, \ldots, M_n]$, written in columns, $$M A_0 = [M_1, \ldots, M_{j-1}, -M_1^r, M_{j+1}, \ldots, M_n], \quad (E72)$$

where $$\left[ M \vec{1} \right]_i^r = \sum_{j=1}^n M_{i,j}.$$

For the arbitrary upper triangular matrix M, the number of operations can be reduced by cancelling known zero summands:

$$\left[ M \vec{1} \right]_i^r = \sum_{j=1}^n M_{i,j}. \quad (E73)$$

Multiplication of $A^f$ applied on upper triangular and square matrices. Since $A^f$ has a particular special structure, the result of multiplication can be obtained with substantially fewer number of flops; consequently, the load on the central processing unit (CPU) is substantially reduced. For an upper triangular matrix, the number of flops can be reduced almost by a factor of two compared to that of a square one.

Thus matrix (E69) is transformed to the upper triangular form. This matrix partially has the required structure. Most of the sub-diagonal elements are zero, except for the columns corresponding to the old reference satellite. It is sufficient to transform diagonal blocks $S_{[N^f],[N^f]} A^f$ to the upper triangular form. The structure of this block is given by $$\begin{bmatrix} & 1 & 2 & & j-1 & j & j+1 & j+2 & L & n-1 & n \\ 1 & \times & \times & L & \times & \times & \times & \times & L & \times & \times \\ 2 & 0 & \times & L & \times & \times & \times & \times & L & \times & \times \\ M & M & M & O & M & M & M & M & O & M & M \\ j-1 & 0 & 0 & L & \times & \times & \times & \times & L & \times & \times \\ j & 0 & 0 & L & 0 & \times & \times & \times & L & \times & \times \\ j+1 & 0 & 0 & L & 0 & \times & \times & \times & L & \times & \times \\ j+2 & 0 & 0 & L & 0 & \times & 0 & \times & L & \times & \times \\ M & M & M & O & M & M & M & M & O & M & M \\ n-1 & 0 & 0 & L & 0 & \times & 0 & 0 & L & \times & \times \\ n & 0 & 0 & L & 0 & \times & 0 & 0 & L & 0 & \times \end{bmatrix}. \quad (E74)$$

Note that only the lower right block is transformed to the upper triangular form. To do this, the QR-update algorithm [see Lawson or Golub] is used. This algorithm reduces the number of flops. Note that for each block $S_{[N^f],[N^f]} A^f$, elements of blocks $S_{[N^{f'}],[N^f]} A^f$, f'>f and corresponding components $s_{[N^f]}$ are re-calculated. That is, a block row of the extended matrix associated with $[N^f]$ is re-calculated. This procedure is successively performed for each system frequency band. The validity of this procedure follows from the fact that, in the process of changing the reference satellite in one frequency, the elements corresponding to other block rows do not change. This is a property of the QR-transformation (made by QR-update). After the reference satellite has changed, the CIC is recalculated.

Ambiguity Processing for a Setting Satellite.

For the satellite that disappears, the columns in the observation matrix which correspond to its ambiguities are zero. Hence no information can be obtained for them. When a satellite disappears, outdated information about its ambiguities first needs to be removed from the CIC. Such a situation can occur when there is fading or interruption in the satellite link. Non-information variables are removed from the state vector and CIC to avoid their estimation. For this purpose, the following algorithm, expressed in pseudo-code, can be used:

---

```
RemoveVariable(&S, &s, d)
{
    w := S[·], d;
```

$$nw2 := \sum_{i=1}^{d} ([w]_i)^2;$$

```
    FormFactors(w, nw2, &a, &α, 1, &n);                     (E75)
    for(i := 1; i < d; i := i + 1)
        Multiply(S[·], i, i, a, α, w, 1, d);
    for(i := d + 1; i ≤ n; i := i + 1)
        Multiply(S[·], i, d, a, α, w, 1, d);
    Multiply(s, d, a, α, w, 1, d);
    S.delRow(d); S.delCol(d);
    s.delRow(d);
}
```

---

One skilled in the art can convert the pseudo-code to computer-executable code.

Consider the algorithms shown in FIG. 7 (E76) and shown in FIG. 8 (E77), expressed in pseudo-code. The algorithm shown in FIG. 7 forms coefficients a,α for the matrix which is the Cholesky decomposition to projection matrix; this operation eliminates the column of S corresponding to the variable to be excluded. The projection matrix can be written as $$P = Id - |w|^{-2} w \cdot w^T, w = S_{[\cdot],[d]}. \quad (E78)$$

Its Cholesky matrix can be expressed as $$\Gamma = \mathrm{diag}(a) + \mathrm{diag}(\alpha, 0) W(w), \quad (E79)$$

where $$a = (a_i)_{i=1}^n, \alpha = (\alpha_i)_{i=1}^{n-1}, \quad (E80)$$

$$W(w) = \begin{bmatrix} 0 & [w]_2 & [w]_3 & K & [w]_{n-1} & [w]_n \\ 0 & 0 & [w]_3 & K & [w]_{n-1} & [w]_n \\ 0 & 0 & 0 & K & [w]_{n-1} & [w]_n \\ M & M & M & O & M & M \\ 0 & 0 & 0 & K & 0 & [w]_n \\ 0 & 0 & 0 & K & 0 & 0 \end{bmatrix}.$$

Since $\Gamma$ has a special structure, left multiplication is made with fewer number of flops. The multiply procedure performs that operation.

Ambiguity Processing for a Rising Satellite.

This situation occurs when a new satellite rises in the constellation. To add this variable to the state vector of ambiguity filter, matrices $S^x, s^x$ are expanded, and the corresponding row and column are filled with zeros. That means that a new variable with zero information has been added to the state vector.

The procedures discussed above for treating change of a reference satellite, appearance of a satellite, and disappearance of a satellite are performed for all satellites and on all frequencies.

Figure 9:
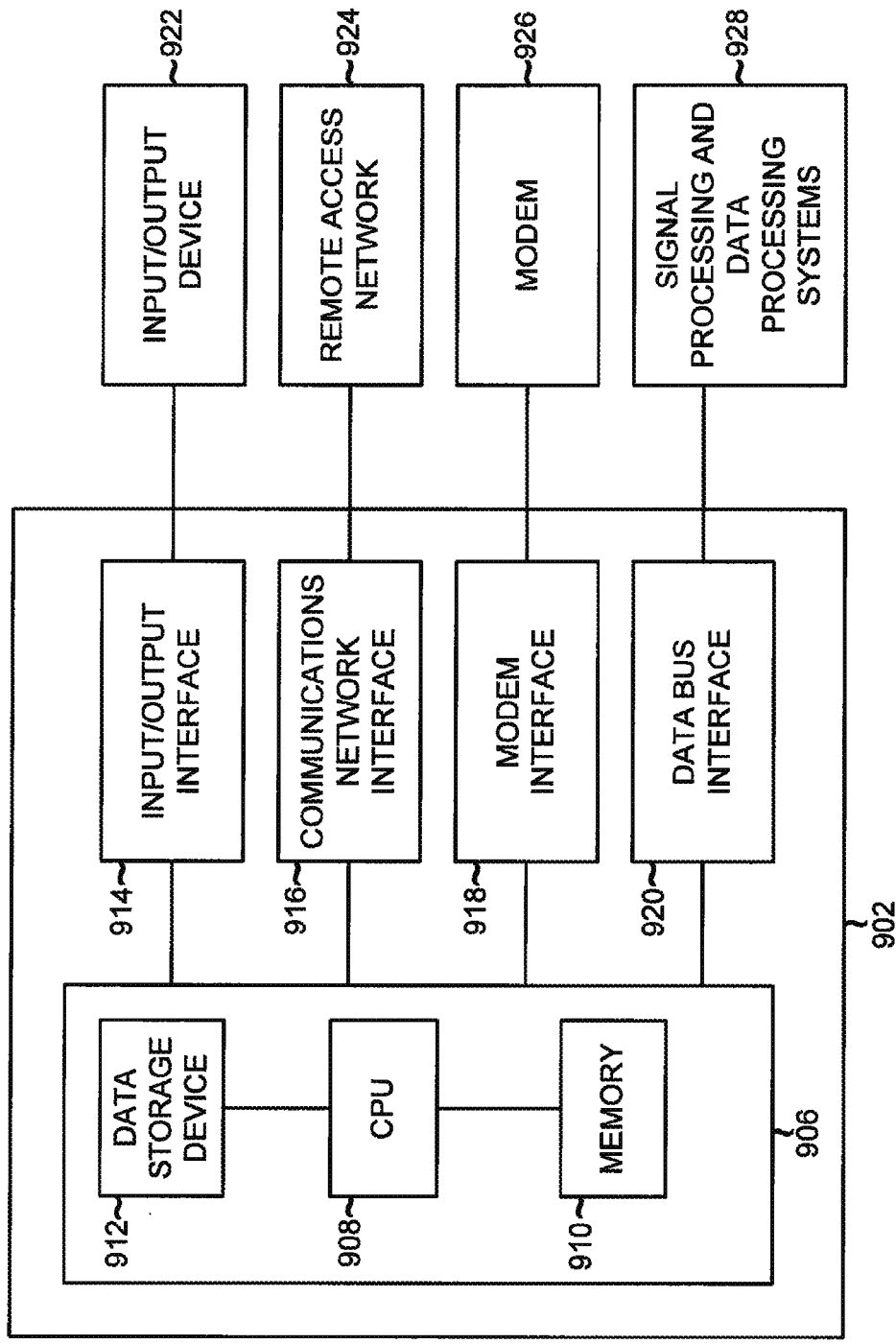
FIG. 9 shows a high-level schematic of a computational system.

An embodiment of a computational system for performing the processes discussed above for detecting and correcting anomalies and resolving ambiguities is shown in FIG. 9. The computational system 902 is typically located in the navigation receiver of a rover; however, it can be a separate unit. One skilled in the art can construct the computational system 902 from various combinations of hardware, firmware, and software. One skilled in the art can construct the computational system 902 from various electronic components, including one or more general purpose microprocessors, one or more digital signal processors, one or more application-specific integrated circuits (ASICs), and one or more field-programmable gate arrays (FPGAs).

Computational system 902 comprises computer 906, which includes a central processing unit (CPU) 908, memory 910, and data storage device 912. Data storage device 912 comprises at least one persistent, non-transitory, tangible computer readable medium, such as non-volatile semiconductor memory, a magnetic hard drive, or a compact disc read only memory. In an embodiment of the invention, computer 906 is implemented as an integrated device.

Computational system 902 can further comprise user input/output interface 914, which interfaces computer 906 to user input/output device 922. Examples of input/output device 922 include a keyboard, a mouse, and a local access terminal. Data, including computer executable code, can be transferred to and from computer 906 via input/output interface 914.

Computational system 902 can further comprise communications network interface 916, which interfaces computer 906 with remote access network 924. Examples of remote access network 924 include a local area network and a wide area network. A user can access computer 906 via a remote access terminal (not shown). Data, including computer executable code, can be transferred to and from computer 906 via communications network interface 916.

Computational system 902 can further comprise a modem interface 918, which interfaces computer 906 with modem 926. In general, a modem refers to a communications device which receives input data from the base or other data source.

Computational system 902 can further comprise data bus interface 920, which interfaces computer 906 with other signal processing systems and data processing systems 928, such as an RF front end (which processes the RF signals received by the antenna of the navigation receiver), an analog-to-digital converter, digital channel processing system, and GNSS coordinate computational system (which calculates the coordinates of the rover).

As is well known, a computer operates under control of computer software, which defines the overall operation of the computer and applications. CPU 908 controls the overall operation of the computer and applications by executing computer program instructions which define the overall operation and applications. The computer program instructions can be stored in data storage device 912 and loaded into memory 910 when execution of the program instructions is desired. The method steps shown in the flowcharts in FIG. 1 and FIG. 2 can be defined by computer program instructions stored in the memory 910 or in the data storage device 912 (or in a combination of memory 910 and data storage device 912) and controlled by the CPU 908 executing the computer program instructions. For example, the computer program instructions can be implemented as computer executable code programmed by one skilled in the art to perform algorithms implementing the method steps shown in the flowcharts in FIG. 1 and FIG. 2. Accordingly, by executing the computer program instructions, the CPU 908 executes algorithms implementing the method steps shown in the flowcharts in FIG. 1 and FIG. 2.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for processing measurements in a global navigation satellite system comprising a first navigation receiver located in a rover and a second navigation receiver located in a base station, the method comprising the steps of:
   receiving a first plurality of measurements based on a first plurality of carrier signals received by the first navigation receiver from a plurality of global navigation satellites;
   receiving a second plurality of measurements based on a second plurality of carrier signals received by the second navigation receiver from the plurality of global navigation satellites, each carrier signal in the second plurality of carrier signals corresponding to a carrier signal in the first plurality of carrier signals, and each measurement in the second plurality of measurements corresponding to a measurement in the first plurality of measurements;

calculating a first plurality of single differences based on the first plurality of measurements and the second plurality of measurements;

determining a state vector based on a prescribed function using the first plurality of single differences, wherein the prescribed function is a Gauss-Newton method;

calculating a second plurality of single differences based on an observation model represented by a prescribed mathematical model applicable to raw measurements for the global navigation satellite system, wherein the prescribed mathematical model is given by:

$$\rho_{r,k}^{f,s} = R_{r,k}^{f,s} + c(\tau_{r,k} + \delta\tau_{r,k}^{(\rho)f,s} - \tau_k^s) + T_{r,k}^s + \mu^{f/f_{ref},s} I_{r,k}^{f_{ref},s} + \zeta_{r,k}^{(\rho)f,s}$$

and $$\varphi_{r,k}^{f,s} = R_{r,k}^{f,s} + c(\tau_{r,k} + \delta\tau_{r,k}^{(\varphi)f,s} - \tau_k^s) + T_{r,k}^s + \mu^{f/f_{ref},s} I_{r,k}^{f_{ref},s} + \lambda^{f,s}(M_r^{f,s} + \psi_{r,k}^s) + \zeta_{r,k}^{(\varphi)f,s};$$

where:

The set of index numbers $_{r,k}^{f,s}$ refer to the following:
f is the index number of the frequency band,
s is the index number of a satellite,
r is the index number of a receiver,
k is the index number of a system time instant,
$\rho_{r,k}^{f,s}$ are line-of-sight pseudo-ranges (in meters) between satellite s and receiver r,
$\varphi_{r,k}^{f,s}$ are line-of-sight carrier phase measurements (in meters) between satellite s and receiver r,
c is the speed of light ($2.99792458 \times 10^8$ m/s),
$R_{r,k}^{f,s} = R(r_{r,k}^s + b_{r,k}^{f,s}, r_{r,k}^s + c_{r,k}^{f,s})$ is the distance from the phase center of the transmitting antenna on satellite s to the phase center of the receiving antenna on receiver r,
$r = (x, y, z)^T$ is the position vector, also referred to herein as the radius vector, in the World Geodetic System 84 (WGS 84) coordinate frame referenced to the center of the Earth,
$r_{r,k}^s$ is the radius vector of satellite s at the instant that the satellite signal is received at receiver r,
$b_{r,k}^{f,s}$ is the displacement vector of the phase center (for the frequency band f) of the receiving antenna on the receiver r relative to the antenna reference point; this vector depends on the direction of satellite s,
$c_{r,k}^{f,s}$ is the displacement vector of the phase center (for the frequency band f) of the transmitting antenna on the satellite s relative to the center-of-mass of the satellite,
$\lambda^{f,s}$ is the wavelength of the carrier signal transmitted by satellite s on frequency band f,
$\tau_k^s$ and $\tau_{r,k}$ are the clock offsets of the satellite clock and the receiver clock, respectively, relative to the system time,
$\delta\tau_{r,k}^{(\rho)f,s}$ and $\delta\tau_{r,k}^{(\varphi)f,s}$ are the code-measurement channel delay and phase-measurement channel delay, respectively,
$T_{r,k}^s$ is the troposphere delay,
$I_{r,k}^{f_{ref},s}$ is the ionosphere delay caused by propagation of the satellite signal through the ionosphere, $$\mu^{f/f_{ref},s} = \frac{[F^{f_{ref},s}]^2}{[F^{f,s}]^2} = (\lambda^{f,s}/\lambda^{f_{ref},s})^2$$

is the ionosphere frequency ratio, where $f_{ref}$ is the index number of a reference frequency band,
$\psi_{r,k}^s = \psi_{r,k}^{(\perp),s} + \psi_{r,k}^{(\parallel),s}$ is the phase incursion (phase increment) due to change in mutual orientation of the antenna on satellite s and the antenna on receiver r. It includes a linear increment $\psi_{r,k}^{(\perp),s}$ caused by turning the antennas in the plane of their dipole axes, and a nonlinear increment $\psi_{r,k}^{(\parallel),s}$ caused by mutual deviation of axes normal to antenna dipoles from the line of sight,
$\zeta_{r,k}^{(\rho)f,s}$ and $\zeta_{r,k}^{(\varphi)f,s}$ are code noise error (including DLL errors and multipath errors) and phase noise error (including PLL errors and multipath errors), respectively, calculating a plurality of residuals based on the first plurality of single differences and the second plurality of single differences;

determining whether the first plurality of measurements and the second plurality of measurements are consistent with the observation model; and in response to determining that the first plurality of measurements and the second plurality of measurements are not consistent with the observation model, detecting anomalous measurements; and eliminating the detected anomalous measurements;

determining whether the remaining measurements are sufficient for determining the state vector, and if the remaining measurements are sufficient for the determining of the state vector then calculating a position of the rover based on the remaining measurements.

2. The method of claim 1, wherein the step of determining whether the first plurality of measurements and the second plurality of measurements are consistent with the observation model comprises the steps of:

calculating the absolute value of each residual in the plurality of residuals;

comparing the absolute value of each residual in the plurality of residuals to a threshold value;

determining that the first plurality of measurements and the second plurality of measurements are consistent with the observation model when the absolute value of each residual in the plurality of residuals is less than or equal to the threshold value; and determining that the first plurality of measurements and the second plurality of measurements are not consistent with the observation model when the absolute value of at least one residual in the plurality of residuals is greater than the threshold value.

3. The method of claim 2, wherein detecting anomalous measurements comprises searching for a maximum absolute value of a residual.

4. The method of claim 1, wherein the step of determining whether the first plurality of measurements and the second plurality of measurements are consistent with the observation model comprises the steps of:

calculating a plurality of weighted residuals based on the plurality of residuals;

calculating the absolute value of each weighted residual in the plurality of weighted residuals;

comparing the absolute value of each weighted residual in the plurality of weighted residuals to a threshold value;

determining that the first plurality of measurements and the second plurality of measurements are consistent with the observation model when the absolute value of each weighted residual in the plurality of weighted residuals is less than or equal to the threshold value; and determining that the first plurality of measurements and the second plurality of measurements are not consistent with the observation model when the absolute value of at least one weighted residual in the plurality of weighted residuals is greater than the threshold value.

5. The method of claim 4, wherein detecting anomalous measurements comprises searching for the maximum absolute value of a weighted residual.

6. The method of claim 1, wherein the step of determining whether the first plurality of measurements and the second plurality of measurements are consistent with the observation model comprises the steps of:

calculating a weighted sum of residual squares based on the plurality of residuals;

comparing the weighted sum of residual squares to a threshold value;

determining that the first plurality of measurements and the second plurality of measurements are consistent with the observation model when the weighted sum of residual squares is less than or equal to the threshold value; and determining that the first plurality of measurements and the second plurality of measurements are not consistent with the observation model when the weighted sum of residual squares is greater than the threshold value.

7. The method of claim 6, wherein detecting anomalous measurements comprises:

for each particular measurement in the first plurality of measurements and the corresponding particular measurement in the second plurality of measurements:

removing the particular measurement in the first plurality of measurements and the corresponding particular measurement in the second plurality of measurements; and calculating an updated weighted sum of residual squares based on the remaining measurements in the first plurality of measurements and the remaining measurements in the second plurality of measurements;

determining the minimum value of the updated weighted sums of residual squares; and determining the particular measurement in the first plurality of measurements and the corresponding particular measurement in the second plurality of measurements corresponding to the minimum value of the updated weighted sums of residual squares.

8. The method of claim 1, wherein the first plurality of measurements comprises a first plurality of pseudo-ranges and the second plurality of measurements comprises a second plurality of pseudo-ranges.

9. The method of claim 1, wherein the first plurality of measurements comprises a first plurality of unambiguous phases and the second plurality of measurements comprises a second plurality of unambiguous phases.

10. An apparatus for processing measurements in a global navigation satellite system comprising a first navigation receiver located in a rover and a second navigation receiver located in a base station, the apparatus comprising:

a data bus interface that receives a first plurality of measurements based on a first plurality of carrier signals received by the first navigation receiver from a plurality of global navigation satellites and receives a second plurality of measurements based on a second plurality of carrier signals received by the second navigation receiver from the plurality of global navigation satellites, each carrier signal in the second plurality of carrier signals corresponding to a carrier signal in the first plurality of carrier signals, and each measurement in the second plurality of measurements corresponding to a measurement in the first plurality of measurements;

a processor;

a memory, for executing computer program instructions stored in a memory, which when executed by the processor, cause the processor to perform operations comprising:

calculating a first plurality of single differences based on the first plurality of measurements and the second plurality of measurements;

determining a state vector based on a prescribed function using the first plurality of single differences, wherein the prescribed function is a Gauss-Newton method;

calculating a second plurality of single differences based on an observation model represented by a prescribed mathematical model applicable to raw measurements for the global navigation satellite system, wherein the prescribed mathematical model is given by at least:

$$\rho_{r,k}^{f,s} = R_{r,k}^{f,s} + c(\tau_{r,k} + \delta\tau_{r,k}^{(\rho)f,s} - \tau_k^s) + T_{r,k}^s + \mu^{f/f_{ref},s} I_{r,k}^{f_{ref},s} + \zeta_{r,k}^{(\rho)f,s}$$

and $$\varphi_{r,k}^{f,s} = R_{r,k}^{f,s} + c(\tau_{r,k} + \delta\tau_{r,k}^{(\varphi)f,s} - \tau_k^s) + T_{r,k}^s + \mu^{f/f_{ref},s} I_{r,k}^{f_{ref},s} + \lambda^{f,s}(M_r^{f,s} + \psi_{r,k}^s) + \zeta_{r,k}^{(\varphi)f,s};$$

where:

The set of index numbers $_{r,k}^{f,s}$ refer to the following:

f is the index number of the frequency band, s is the index number of a satellite, r is the index number of a receiver, k is the index number of a system time instant, $\rho_{r,k}^{f,s}$ are line-of-sight pseudo-ranges (in meters) between satellite s and receiver r, $\varphi_{r,k}^{f,s}$ are line-of-sight carrier phase measurements (in meters) between satellite s and receiver r, c is the speed of light ($2.99792458 \times 10^8$ m/s), $R_{r,k}^{f,s} = R(r_{r,k}^s + b_{r,k}^{f,s}, r_{r,k}^s + c_{r,k}^{f,s})$ is the distance from the phase center of the transmitting antenna on satellite s to the phase center of the receiving antenna on receiver r, $r = (x, y, z)^T$ is the position vector, also referred to herein as the radius vector, in the World Geodetic System 84 (WGS 84) coordinate frame referenced to the center of the Earth, $r_{r,k}^s$ is the radius vector of satellite s at the instant that the satellite signal is received at receiver r, $b_{r,k}^{f,s}$ is the displacement vector of the phase center (for the frequency band f) of the receiving antenna on the receiver r relative to the antenna reference point; this vector depends on the direction of satellite s, $c_{r,k}^{f,s}$ is the displacement vector of the phase center (for the frequency band f) of the transmitting antenna on the satellite s relative to the center-of-mass of the satellite, $\lambda_{f,s}$ is the wavelength of the carrier signal transmitted by satellite s on frequency band f, $\tau_k^s$ and $\tau_{r,k}$ are the clock offsets of the satellite clock and the receiver clock, respectively, relative to the system time, $\delta\tau_{r,k}^{(\rho)f,s}$ and $\delta\tau_{r,k}^{(\varphi)f,s}$ are the code-measurement channel delay and phase-measurement channel delay, respectively, $T_{r,k}^s$ is the troposphere delay, $I_{r,k}^{f_{ref},s}$ is the ionosphere delay caused by propagation of the satellite signal through the ionosphere, $$\mu^{f/f_{ref},s} = \frac{[F^{f_{ref},s}]^2}{[F^{f,s}]^2} = (\lambda^{f,s}/\lambda^{f_{ref},s})^2$$

is the ionosphere frequency ratio, where $f_{ref}$ is the index number of a reference frequency band, $\psi_{r,k}^s = \psi_{r,k}^{(\perp),s} + \psi_{r,k}^{(\parallel),s}$ is the phase incursion (phase increment) due to change in mutual orientation of the antenna on satellite s and the antenna on receiver r. It includes a linear increment $\psi_{r,k}^{(\perp),s}$ caused by turning the antennas in the plane of their dipole axes, and a nonlinear increment $\psi_{r,k}^{(\parallel),s}$ caused by mutual deviation of axes normal to antenna dipoles from the line of sight, $\zeta_{r,k}^{(P)f,s}$ and $\zeta_{r,k}^{(\varphi)f,s}$ are code noise error (including DLL errors and multipath errors) and phase noise error (including PLL errors and multipath errors), respectively, calculating a plurality of residuals based on the first plurality of single differences and the second plurality of single differences;

determining whether the first plurality of measurements and the second plurality of measurements are consistent with the observation model; and in response to determining that the first plurality of measurements and the second plurality of measurements are not consistent with the observation model, detecting anomalous measurements; and eliminating the detected anomalous measurements;

determining whether the remaining measurements are sufficient for determining the state vector, and if the remaining measurements are sufficient for the determining of the state vector then calculating a position of the rover based on the remaining measurements.

11. The apparatus of claim 10, wherein the determining whether the first plurality of measurements and the second plurality of measurements are consistent with the observation model operation further comprises:

calculating the absolute value of each residual in the plurality of residuals;

comparing the absolute value of each residual in the plurality of residuals to a threshold value;

determining that the first plurality of measurements and the second plurality of measurements are consistent with the observation model when the absolute value of each residual in the plurality of residuals is less than or equal to the threshold value; and determining that the first plurality of measurements and the second plurality of measurements are not consistent with the observation model when the absolute value of at least one residual in the plurality of residuals is greater than the threshold value.

12. The apparatus of claim 11, wherein the detecting anomalous measurements operation further comprises:

in response to determining that the first plurality of measurements and the second plurality of measurements are not consistent with the observation model, searching for a maximum absolute value of a residual.

13. The apparatus of claim 10, wherein the determining whether the first plurality of measurements and the second plurality of measurements are consistent with the observation model operation further comprises:

calculating a plurality of weighted residuals based on the plurality of residuals;

calculating the absolute value of each weighted residual in the plurality of weighted residuals;

comparing the absolute value of each weighted residual in the plurality of weighted residuals to a threshold value;

determining that the first plurality of measurements and the second plurality of measurements are consistent with the observation model when the absolute value of each weighted residual in the plurality of weighted residuals is less than or equal to the threshold value; and determining that the first plurality of measurements and the second plurality of measurements are not consistent with the observation model when the absolute value of at least one weighted residual in the plurality of weighted residuals is greater than the threshold value.

14. The apparatus of claim 13, wherein detecting anomalous measurements operation further comprises:

in response to determining that the first plurality of measurements and the second plurality of measurements are not consistent with the observation model, searching for the maximum absolute value of a weighted residual.

15. The apparatus of claim 10, wherein the determining whether the first plurality of measurements and the second plurality of measurements are consistent with the observation model operation further comprises:

calculating a weighted sum of residual squares based on the plurality of residuals;

comparing the weighted sum of residual squares to a threshold value;

determining that the first plurality of measurements and the second plurality of measurements are consistent with the observation model when the weighted sum of residual squares is less than or equal to the threshold value; and determining that the first plurality of measurements and the second plurality of measurements are not consistent with the observation model when the weighted sum of residual squares is greater than the threshold value.

16. The apparatus of claim 15, wherein the detecting anomalous measurements operation further comprises:

in response to determining that the first plurality of measurements and the second plurality of measurements are not consistent with the observation model, for each particular measurement in the first plurality of measurements and the corresponding particular measurement in the second plurality of measurements:

removing the particular measurement in the first plurality of measurements and the corresponding particular measurement in the second plurality of measurements; and calculating an updated weighted sum of residual squares based on the remaining measurements in the first plurality of measurements and the remaining measurements in the second plurality of measurements;

determining the minimum value of the updated weighted sums of residual squares; and determining the particular measurement in the first plurality of measurements and the corresponding particular measurement in the second plurality of measurements corresponding to the minimum value of the updated weighted sums of residual squares.

17. The apparatus of claim 16, wherein the first plurality of measurements comprises a first plurality of pseudo-ranges and the second plurality of measurements comprises a second plurality of pseudo-ranges.

18. The apparatus of claim 16, wherein the first plurality of measurements comprises a first plurality of unambiguous phases and the second plurality of measurements comprises a second plurality of unambiguous phases.

19. A non-transitory computer readable medium storing computer program instructions for processing measurements in a global navigation satellite system comprising a first navigation receiver located in a rover and a second navigation receiver located in a base station, which, when executed on a processor, cause the processor to perform operations comprising:
receiving a first plurality of measurements based on a first plurality of carrier signals received by the first navigation receiver from a plurality of global navigation satellites;
receiving a second plurality of measurements based on a second plurality of carrier signals received by the second navigation receiver from the plurality of global navigation satellites, each carrier signal in the second plurality of carrier signals corresponding to a carrier signal in the first plurality of carrier signals, and each measurement in the second plurality of measurements corresponding to a measurement in the first plurality of measurements;
calculating a first plurality of single differences based on the first plurality of measurements and the second plurality of measurements;
determining a state vector based on a prescribed function using the first plurality of single differences, wherein the prescribed function is a Gauss-Newton method;
calculating a second plurality of single differences based on an observation model represented by a prescribed mathematical model applicable to raw measurements for the global navigation satellite system, wherein the prescribed mathematical model is given by at least:

$$\rho_{r,k}^{f,s} = R_{r,k}^{f,s} + c(\tau_{r,k} + \delta\tau_{r,k}^{(P)f,s} - \tau_k^s) + T_{r,k}^s + \mu^{f/f_{ref},s} I_{r,k}^{f_{ref},s} + \zeta_{r,k}^{(P)f,s}$$

and $$\varphi_{r,k}^{f,s} = R_{r,k}^{f,s} + c(\tau_{r,k} + \delta\tau_{r,k}^{(\varphi)f,s} - \tau_k^s) + T_{r,k}^s + \mu^{f/f_{ref},s} I_{r,k}^{f_{ref},s} + \lambda^{f,s}(M_r^{f,s} + \psi_{r,k}^s) + \zeta_{r,k}^{(\varphi)f,s};$$

where:
The set of index numbers $_{r,k}^{f,s}$ refer to the following:
f is the index number of the frequency band,
s is the index number of a satellite,
r is the index number of a receiver,
k is the index number of a system time instant,
$\rho_{r,k}^{f,s}$ are line-of-sight pseudo-ranges (in meters) between satellite s and receiver r,
$\varphi_{r,k}^{f,s}$ are line-of-sight carrier phase measurements (in meters) between satellite s and receiver r,
c is the speed of light (2.99792458×10$^8$ m/s),
$R_{r,k}^{f,s} = R(r_{r,k}^s + b_{r,k}^{f,s}, r_{r,k}^s + c_{r,k}^{f,s})$ is the distance from the phase center of the transmitting antenna on satellite s to the phase center of the receiving antenna on receiver r,
$r=(x, y, z)^T$ is the position vector, also referred to herein as the radius vector, in the World Geodetic System 84 (WGS 84) coordinate frame referenced to the center of the Earth,
$r_{r,k}^s$ is the radius vector of satellite s at the instant that the satellite signal is received at receiver r,
$b_{r,k}^{f,s}$ is the displacement vector of the phase center (for the frequency band f) of the receiving antenna on the receiver r relative to the antenna reference point; this vector depends on the direction of satellite s,
$c_{r,k}^{f,s}$ is the displacement vector of the phase center (for the frequency band f) of the transmitting antenna on the satellite s relative to the center-of-mass of the satellite,
$\lambda^{f,s}$ the wavelength of the carrier signal transmitted by satellite s on frequency band f,
$\tau_k^s$ and $\tau_{r,k}$ are the clock offsets of the satellite clock and the receiver clock, respectively, relative to the system time,
$\delta\tau_{r,k}^{(P)f,s}$ and $\delta\tau_{r,k}^{(\varphi)f,s}$ are the code-measurement channel delay and phase-measurement channel delay, respectively,
$T_{r,k}^s$ is the troposphere delay,
$I_{r,k}^{f_{ref},s}$ is the ionosphere delay caused by propagation of the satellite signal through the ionosphere, $$\mu^{f/f_{ref},s} = \frac{[F^{f_{ref},s}]^2}{[F^{f,s}]^2} = (\lambda^{f,s}/\lambda^{f_{ref},s})^2$$

is the ionosphere frequency ratio, where $f_{ref}$ is the index number of a reference frequency band,
$\psi_{r,k}^s = \psi_{r,k}^{(L),s} + \psi_{r,k}^{(ll),s}$ is the phase incursion (phase increment) due to change in mutual orientation of the antenna on satellite s and the antenna on receiver r. It includes a linear increment $\psi_{r,k}^{(L),s}$ caused by turning the antennas in the plane of their dipole axes, and a nonlinear increment $\psi_{r,k}^{(ll),s}$ caused by mutual deviation of axes normal to antenna dipoles from the line of sight,
$\zeta_{r,k}^{(P)f,s}$ and $\zeta_{r,k}^{(\varphi)f,s}$ are code noise error (including DLL errors and multipath errors) and phase noise error (including PLL errors and multipath errors), respectively,
calculating a plurality of residuals based on the first plurality of single differences and the second plurality of single differences;
determining whether the first plurality of measurements and the second plurality of measurements are consistent with the observation model; and
in response to determining that the first plurality of measurements and the second plurality of measurements are not consistent with the observation model, detecting anomalous measurements; and
eliminating the detected anomalous measurements;
determining whether the remaining measurements are sufficient for determining the state vector, and if the remaining measurements are sufficient for the determining of the state vector then
calculating a position of the rover based on the remaining measurements.

20. The non-transitory computer readable medium of claim 19, wherein the determining whether the first plurality of measurements and the second plurality of measurements are consistent with the observation model operation further comprises:
calculating the absolute value of each residual in the plurality of residuals;
comparing the absolute value of each residual in the plurality of residuals to a threshold value;
determining that the first plurality of measurements and the second plurality of measurements are consistent with the observation model when the absolute value of each residual in the plurality of residuals is less than or equal to the threshold value; and determining that the first plurality of measurements and the second plurality of measurements are not consistent with the observation model when the absolute value of at least one residual in the plurality of residuals is greater than the threshold value.

21. The non-transitory computer readable medium of claim 20, wherein the detecting anomalous measurements operation further comprises:
in response to determining that the first plurality of measurements and the second plurality of measurements are not consistent with the observation model, searching for a maximum absolute value of a residual.

22. The non-transitory computer readable medium of claim 19, wherein the determining whether the first plurality of measurements and the second plurality of measurements are consistent with the observation model operation further comprises:
calculating a plurality of weighted residuals based on the plurality of residuals;
calculating the absolute value of each weighted residual in the plurality of weighted residuals;
comparing the absolute value of each weighted residual in the plurality of weighted residuals to a threshold value;
determining that the first plurality of measurements and the second plurality of measurements are consistent with the observation model when the absolute value of each weighted residual in the plurality of weighted residuals is less than or equal to the threshold value; and
determining that the first plurality of measurements and the second plurality of measurements are not consistent with the observation model when the absolute value of at least one weighted residual in the plurality of weighted residuals is greater than the threshold value.

23. The non-transitory computer readable medium of claim 22, wherein the detecting anomalous measurements operation further comprises:
in response to determining that the first plurality of measurements and the second plurality of measurements are not consistent with the observation model, searching for the maximum absolute value of a weighted residual.

24. The non-transitory computer readable medium of claim 19, wherein the determining whether the first plurality of measurements and the second plurality of measurements are consistent with the observation model operation further comprises:
calculating a weighted sum of residual squares based on the plurality of residuals;
comparing the weighted sum of residual squares to a threshold value;
determining that the first plurality of measurements and the second plurality of measurements are consistent with the observation model when the weighted sum of residual squares is less than or equal to the threshold value; and
determining that the first plurality of measurements and the second plurality of measurements are not consistent with the observation model when the weighted sum of residual squares is greater than the threshold value.

25. The non-transitory computer readable medium of claim 24, wherein the detecting anomalous measurements operation further comprises:
in response to determining that the first plurality of measurements and the second plurality of measurements are not consistent with the observation model:
for each particular measurement in the first plurality of measurements and the corresponding particular measurement in the second plurality of measurements:
removing the particular measurement in the first plurality of measurements and the corresponding particular measurement in the second plurality of measurements; and
calculating an updated weighted sum of residual squares based on the remaining measurements in the first plurality of measurements and the remaining measurements in the second plurality of measurements;
determining the minimum value of the updated weighted sums of residual squares; and
determining the particular measurement in the first plurality of measurements and the corresponding particular measurement in the second plurality of measurements corresponding to the minimum value of the updated weighted sums of residual squares.

26. The non-transitory computer readable medium of claim 19, wherein the first plurality of measurements comprises a first plurality of pseudo-ranges and the second plurality of measurements comprises a second plurality of pseudo-ranges.

27. The non-transitory computer readable medium of claim 19, wherein the first plurality of measurements comprises a first plurality of unambiguous phases and the second plurality of measurements comprises a second plurality of unambiguous phases.

* * * * *

UNITED STATES PATENT AND TRADEMARK OFFICE
CERTIFICATE OF CORRECTION

PATENT NO. : 9,891,325 B2
APPLICATION NO. : 14/273120
DATED : February 13, 2018
INVENTOR(S) : Daniel Milyutin et al.

It is certified that error appears in the above-identified patent and that said Letters Patent is hereby corrected as shown below:

On the Title Page

At Item (62), the date of the divisional application "filed on Nov. 10, 2000" should read --filed on Nov. 10, 2010--

In the Specification

Column 9, Line 19, "$r_{r,k}^{f,s}$" should read -- $r_{r,k}^{f,s}$ --

Column 9, Line 28, "$\rho_{r,k}^{f,s}$" should read -- $\rho_{r,k}^{f,s}$ --

Column 9, Line 30, "$\varphi_{r,k}^{f,s}$" should read -- $\varphi_{r,k}^{f,s}$ --

Column 9, Line 32, "$\varphi_{r,k}^{f,s}$" should read -- $\varphi_{r,k}^{f,s}$ --

Column 9, Line 36, "$R_{r,k}^{f,s} = R(\mathbf{r}_{r,k}^{s} + \mathbf{b}_{r,k}^{f,s}, \mathbf{r}_{r,k}^{s} + \mathbf{c}_{r,k}^{f,s})$" should read -- $R_{r,k}^{f,s} = R(\mathbf{r}_{r,k}^{s} + \mathbf{b}_{r,k}^{f,s}, \mathbf{r}_{r,k}^{s} + \mathbf{c}_{r,k}^{f,s})$ --

Column 9, Line 47, "$\mathbf{r}_{r,k}^{s}$" should read -- $\mathbf{r}_{r,k}^{s}$ --

Signed and Sealed this
Twentieth Day of November, 2018

Andrei Iancu
*Director of the United States Patent and Trademark Office*

CERTIFICATE OF CORRECTION (continued)
U.S. Pat. No. 9,891,325 B2

Column 9, Line 52, "$\mathbf{r}_{r,k}{}^s$" should read -- $\mathbf{r}_{r,k}^s$ --

Column 9, Line 54, "$\mathbf{b}_{r,k}{}^{f,s}$" should read -- $\mathbf{b}_{r,k}^{f,s}$ --

Column 9, Line 66, "$\mathbf{c}_{r,k}{}^{f,s}$" should read -- $\mathbf{c}_{r,k}^{f,s}$ --

Column 11, Line 16, "$\delta\tau_{r,k}{}^{(\rho)f,s}$ and $\delta\tau_{r,k}{}^{(\varphi)f,s}$," should read -- $\delta\tau_{r,k}^{(\rho)f,s}$ and $\delta\tau_{r,k}^{(\varphi)f,s}$ --

Column 11, Line 24, "$T_{r,k}{}^s$" should read -- $T_{r,k}^s$ --

Column 11, Line 26, "$I_{r,k}{}^{f_{ref},s}$" should read -- $I_{r,k}^{f_{ref},s}$ --

Column 11, Line 64, "$\psi_{r,k}{}^s = \psi_{r,k}{}^{(\perp),s} + \psi_{r,k}{}^{(P)s}$," should read -- $\psi_{r,k}^s = \psi_{r,k}^{(\perp),s} + \psi_{r,k}^{(\|),s}$ --

Column 12, Line 2, "$\psi_{r,k}{}^{(P),s}$" should read -- $\psi_{r,k}^{(\|),s}$ --

Column 12, Line 4, "$\varsigma_{r,k}{}^{(\rho)f,s}$ and $\varsigma_{r,k}{}^{(\varphi)f,s}$" should read -- $\varsigma_{r,k}^{(\rho)f,s}$ and $\varsigma_{r,k}^{(\varphi)f,s}$ --

Column 12, Lines 26-27,

"$$\rho_{r,k}{}^{f,s} = R_{r,k}{}^{f,s} + c(\tau_{r,k} + \delta\tau_{r,k}{}^{(\rho)f,s} - \tau_k{}^s) + T_{r,k}{}^s$$
$$+ \mu^{f/f_{ref},s} I_{r,k}{}^{f_{ref},s} + \varsigma_{r,k}{}^{(\rho)f,s}$$"

should read --

$$\rho_{r,k}^{f,s} = R_{r,k}^{f,s} + c(\tau_{r,k} + \delta\tau_{r,k}^{(\rho)f,s} - \tau_k^s) + T_{r,k}^s$$
$$+ \mu^{f/f_{ref},s} I_{r,k}^{f_{ref},s} + \varsigma_{r,k}^{(\rho)f,s}$$

--

Column 12, Lines 31-32,

" $\varphi_{r,k}^{f,s} = R_{r,k}^{f,s} + c(\tau_{r,k} + \delta\tau_{r,k}^{(\varphi)f,s} - \tau_k^s) + T_{r,k}^s$
$+ \mu^{f/f_{ref},s} I_{r,k}^{f_{ref},s} + \lambda^{f,s}(M_r^{f,s} + \psi_{r,k}^s) + \zeta_{r,k}^{(\varphi)f,s}$ "

should read --
$\varphi_{r,k}^{f,s} = R_{r,k}^{f,s} + c(\tau_{r,k} + \delta\tau_{r,k}^{(\varphi)f,s} - \tau_k^s) + T_{r,k}^s$
$- \mu^{f/f_{ref},s} I_{r,k}^{f_{ref},s} + \lambda^{f,s}(M_r^{f,s} + \psi_{r,k}^s) + \zeta_{r,k}^{(\varphi)f,s}$ --

In the Claims

Claim 1, Column 33, Lines 15-16,

" $\rho_{r,k}^{f,s} = R_{r,k}^{f,s} + c(\tau_{r,k} + \delta\tau_{r,k}^{(\rho)f,s} - \tau_k^s) + T_{r,k}^s$
$+ \mu^{f/f_{ref},s} I_{r,k}^{f_{ref},s} + \zeta_{r,k}^{(\rho)f,s}$ "

should read --
$\rho_{r,k}^{f,s} = R_{r,k}^{f,s} + c(\tau_{r,k} + \delta\tau_{r,k}^{(\rho)f,s} - \tau_k^s) + T_{r,k}^s$
$+ \mu^{f/f_{ref},s} I_{r,k}^{f_{ref},s} + \zeta_{r,k}^{(\rho)f,s}$ --

Claim 1, Column 33, Lines 19-20,

" $\varphi_{r,k}^{f,s} = R_{r,k}^{f,s} + c(\tau_{r,k} + \delta\tau_{r,k}^{(\varphi)f,s} - \tau_k^s) + T_{r,k}^s$
$+ \mu^{f/f_{ref},s} I_{r,k}^{f_{ref},s} + \lambda^{f,s}(M_r^{f,s} + \psi_{r,k}^s) + \zeta_{r,k}^{(\varphi)f,s}$ "

should read --
$\varphi_{r,k}^{f,s} = R_{r,k}^{f,s} + c(\tau_{r,k} + \delta\tau_{r,k}^{(\varphi)f,s} - \tau_k^s) + T_{r,k}^s$
$- \mu^{f/f_{ref},s} I_{r,k}^{f_{ref},s} + \lambda^{f,s}(M_r^{f,s} + \psi_{r,k}^s) + \zeta_{r,k}^{(\varphi)f,s}$ --

Claim 1, Column 33, Line 22, " $r,k^{f,s}$ " should read -- $r,k^{f,s}$ --

Claim 1, Column 33, Line 28, " $\rho_{r,k}^{f,s}$ " should read -- $\rho_{r,k}^{f,s}$ --

Claim 1, Column 33, Line 30, " $\varphi_{r,k}^{f,s}$ " should read -- $\varphi_{r,k}^{f,s}$ --

CERTIFICATE OF CORRECTION (continued)
U.S. Pat. No. 9,891,325 B2

Claim 1, Column 33, Line 33, "$R_{r,k}^{f,s} = R(\mathbf{r}_{r,k}^{s} + \mathbf{b}_{r,k}^{f,s}, \mathbf{r}_{r,k}^{s} + \mathbf{c}_{r,k}^{f,s})$"
should read -- $R_{r,k}^{f,s} = R(\mathbf{r}_{r,k}^{s} + \mathbf{b}_{r,k}^{f,s}, \mathbf{r}_{r,k}^{s} + \mathbf{c}_{r,k}^{f,s})$ --

Claim 1, Column 33, Line 41, "$\mathbf{r}_{r,k}^{s}$" should read -- $\mathbf{r}_{r,k}^{s}$ --

Claim 1, Column 33, Line 43, "$\mathbf{b}_{r,k}^{f,s}$" should read -- $\mathbf{b}_{r,k}^{f,s}$ --

Claim 1, Column 33, Line 47, "$\mathbf{c}_{r,k}^{f,s}$" should read -- $\mathbf{c}_{r,k}^{f,s}$ --

Claim 1, Column 33, Line 56, "$\delta\tau_{r,k}^{(\rho)f,s}$ and $\delta\tau_{r,k}^{(\varphi)f,s}$"
should read -- $\delta\tau_{r,k}^{(\rho)f,s}$ and $\delta\tau_{r,k}^{(\varphi)f,s}$ --

Claim 1, Column 33, Line 59, "$T_{r,k}^{s}$" should read -- $T_{r,k}^{s}$ --

Claim 1, Column 33, Line 60, "$I_{r,k}^{f_{ref},s}$" should read -- $I_{r,k}^{f_{ref},s}$ --

Claim 1, Column 34, Line 3, "$\psi_{r,k}^{s} = \psi_{r,k}^{(\perp),s} + \psi_{r,k}^{(\parallel),s}$"
should read -- $\psi_{r,k}^{s} = \psi_{r,k}^{(\perp),s} + \psi_{r,k}^{(\parallel),s}$ --

Claim 1, Column 34, Line 6, "$\psi_{r,k}^{(\perp),s}$" should read -- $\psi_{r,k}^{(\perp),s}$ --

Claim 1, Column 34, Line 8, "$\psi_{r,k}^{(\parallel),s}$" should read -- $\psi_{r,k}^{(\parallel),s}$ --

Claim 1, Column 34, Line 11, "$\zeta_{r,k}^{(\rho)f,s}$ and $\zeta_{r,k}^{(\varphi)f,s}$"
should read -- $\zeta_{r,k}^{(\rho)f,s}$ and $\zeta_{r,k}^{(\varphi)f,s}$ --

CERTIFICATE OF CORRECTION (continued)
U.S. Pat. No. 9,891,325 B2

Page 5 of 8

Claim 10, Column 36, Line 23-24,

"
$$\rho_{r,k}{}^{f,s} = R_{r,k}{}^{f,s} + c(\tau_{r,k} + \delta\tau_{r,k}{}^{(\rho)f,s} - \tau_k{}^s) + T_{r,k}{}^s$$
$$+ \mu^{f/f_{ref},s} I_{r,k}{}^{f_{ref},s} + \zeta_{r,k}{}^{(\rho)f,s}$$
"

should read --
$$\rho_{r,k}^{f,s} = R_{r,k}^{f,s} + c(\tau_{r,k} + \delta\tau_{r,k}^{(\rho)f,s} - \tau_k^s) + T_{r,k}^s$$
$$+ \mu^{f/f_{ref},s} I_{r,k}^{f_{ref},s} + \zeta_{r,k}^{(\rho)f,s}$$
--

Claim 10, Column 36, Line 28-29,

"
$$\varphi_{r,k}{}^{f,s} = R_{r,k}{}^{f,s} + c(\tau_{r,k} + \delta\tau_{r,k}{}^{(\varphi)f,s} - \tau_k{}^s) + T_{r,k}{}^s$$
$$+ \mu^{f/f_{ref},s} I_{r,k}{}^{f_{ref},s} + \lambda^{f,s}(M_r{}^{f,s} + \psi_{r,k}{}^s) + \zeta_{r,k}{}^{(\varphi)f,s}$$
"

should read --
$$\varphi_{r,k}^{f,s} = R_{r,k}^{f,s} + c(\tau_{r,k} + \delta\tau_{r,k}^{(\varphi)f,s} - \tau_k^s) + T_{r,k}^s$$
$$- \mu^{f/f_{ref},s} I_{r,k}^{f_{ref},s} + \lambda^{f,s}(M_r^{f,s} + \psi_{r,k}^s) + \zeta_{r,k}^{(\varphi)f,s}$$
--

Claim 10, Column 36, Line 31, "$_{r,k}{}^{f,s}$" should read -- $_{r,k}^{f,s}$ --

Claim 10, Column 36, Line 36, "$\rho_{r,k}{}^{f,s}$" should read -- $\rho_{r,k}^{f,s}$ --

Claim 10, Column 36, Line 38, "$\varphi_{r,k}{}^{f,s}$" should read -- $\varphi_{r,k}^{f,s}$ --

Claim 10, Column 36, Line 41, "$R_{r,k}{}^{f,s} = R(\mathbf{r}_{r,k}{}^s + \mathbf{b}_{r,k}{}^{f,s}, \mathbf{r}_{r,k}{}^s + \mathbf{c}_{r,k}{}^{f,s})$" should read -- $R_{r,k}^{f,s} = R(\mathbf{r}_{r,k}^s + \mathbf{b}_{r,k}^{f,s}, \mathbf{r}_{r,k}^s + \mathbf{c}_{r,k}^{f,s})$ --

Claim 10, Column 36, Line 49, "$\mathbf{r}_{r,k}{}^s$" should read -- $\mathbf{r}_{r,k}^s$ --

Claim 10, Column 36, Line 51, "$\mathbf{b}_{r,k}{}^{f,s}$" should read -- $\mathbf{b}_{r,k}^{f,s}$ --

Claim 10, Column 36, Line 55, "$\mathbf{c}_{r,k}{}^{f,s}$" should read -- $\mathbf{c}_{r,k}^{f,s}$ --

CERTIFICATE OF CORRECTION (continued)
U.S. Pat. No. 9,891,325 B2

Claim 10, Column 36, Line 59, "$\lambda_{f,s}$" should read -- $\lambda^{f,s}$ --

Claim 10, Column 36, Line 64, "$\delta\tau_{r,k}^{(\rho)f,s}$ and $\delta\tau_{r,k}^{(\varphi)f,s}$" should read -- $\delta\tau_{r,k}^{(\rho)f,s}$ and $\delta\tau_{r,k}^{(\varphi)f,s}$ --

Claim 10, Column 36, Line 67, "$T_{r,k}{}^s$" should read -- $T_{r,k}^s$ --

Claim 10, Column 37, Line 1, "$I_{r,k}{}^{f_{ref},s}$" should read -- $I_{r,k}^{f_{ref},s}$ --

Claim 10, Column 37, Line 11, "$\psi_{r,k}{}^s = \psi_{r,k}^{(\perp),s} + \psi_{r,k}^{(\|),s}$" should read -- $\psi_{r,k}^s = \psi_{r,k}^{(\perp),s} + \psi_{r,k}^{(\|),s}$ --

Claim 10, Column 37, Line 14, "$\psi_{r,k}{}^{(\perp),s}$" should read -- $\psi_{r,k}^{(\perp),s}$ --

Claim 10, Column 37, Line 16, "$\psi_{r,k}{}^{(\|),s}$" should read -- $\psi_{r,k}^{(\|),s}$ --

Claim 10, Column 37, Line 19, "$\zeta_{r,k}{}^{(\rho)f,s}$ and $\zeta_{r,k}{}^{(\varphi)f,s}$" should read -- $\zeta_{r,k}^{(\rho)f,s}$ and $\zeta_{r,k}^{(\varphi)f,s}$ --

Claim 19, Column 39, Lines 36-37,

"$$\rho_{r,k}{}^{f,s} = R_{r,k}{}^{f,s} + c(\tau_{r,k} + \delta\tau_{r,k}{}^{(\rho)f,s} - \tau_k{}^s) + T_{r,k}{}^s + \mu^{f/f_{ref},s} I_{r,k}{}^{f_{ref},s} + \zeta_{r,k}{}^{(\rho)f,s}$$"

should read --
$$\rho_{r,k}^{f,s} = R_{r,k}^{f,s} + c(\tau_{r,k} + \delta\tau_{r,k}^{(\rho)f,s} - \tau_k^s) + T_{r,k}^s + \mu^{f/f_{ref},s} I_{r,k}^{f_{ref},s} + \zeta_{r,k}^{(\rho)f,s}$$
--

CERTIFICATE OF CORRECTION (continued)
U.S. Pat. No. 9,891,325 B2

Claim 19, Column 39, Lines 41-42,

"
$$\varphi_{r,k}^{f,s} = R_{r,k}^{f,s} + c(\tau_{r,k} + \delta\tau_{r,k}^{(\varphi)f,s} - \tau_k^s) + T_{r,k}^s$$
$$+ \mu^{f/f_{ref},s} I_{r,k}^{f_{ref},s} + \lambda^{f,s}(M_r^{f,s} + \psi_{r,k}^s) + \zeta_{r,k}^{(\varphi)f,s}$$
"

should read --
$$\varphi_{r,k}^{f,s} = R_{r,k}^{f,s} + c(\tau_{r,k} + \delta\tau_{r,k}^{(\varphi)f,s} - \tau_k^s) + T_{r,k}^s$$
$$- \mu^{f/f_{ref},s} I_{r,k}^{f_{ref},s} + \lambda^{f,s}(M_r^{f,s} + \psi_{r,k}^s) + \zeta_{r,k}^{(\varphi)f,s}$$ --

Claim 19, Column 39, Line 44, "$r,k^{f,s}$" should read -- $r,k^{f,s}$ --

Claim 19, Column 39, Line 49, "$\rho_{r,k}{}^{f,s}$" should read -- $\rho_{r,k}^{f,s}$ --

Claim 19, Column 39, Line 51, "$\varphi_{r,k}{}^{f,s}$" should read -- $\varphi_{r,k}^{f,s}$ --

Claim 19, Column 39, Line 54, "$R_{r,k}{}^{f,s} = R(\mathbf{r}_{r,k}{}^s + \mathbf{b}_{r,k}{}^{f,s}, \mathbf{r}_{r,k}{}^s + \mathbf{c}_{r,k}{}^{f,s})$,"

should read -- $R_{r,k}^{f,s} = R(\mathbf{r}_{r,k}^s + \mathbf{b}_{r,k}^{f,s}, \mathbf{r}_{r,k}^s + \mathbf{c}_{r,k}^{f,s})$ --

Claim 19, Column 39, Line 62, "$\mathbf{r}_{r,k}{}^s$" should read -- $\mathbf{r}_{r,k}^s$ --

Claim 19, Column 39, Line 64, "$\mathbf{b}_{r,k}{}^{f,s}$" should read -- $\mathbf{b}_{r,k}^{f,s}$ --

Claim 19, Column 40, Line 1, "$\mathbf{c}_{r,k}{}^{f,s}$" should read -- $\mathbf{c}_{r,k}^{f,s}$ --

Claim 19, Column 40, Line 10, "$\delta\tau_{r,k}{}^{(\rho)f,s}$ and $\delta\tau_{r,k}{}^{(\varphi)f,s}$"

should read -- $\delta\tau_{r,k}^{(\rho)f,s}$ and $\delta\tau_{r,k}^{(\varphi)f,s}$ --

Claim 19, Column 40, Line 13, "$T_{r,k}{}^s$" should read -- $T_{r,k}^s$ --

Claim 19, Column 40, Line 14, "$I_{r,k}{}^{f_{ref},s}$" should read -- $I_{r,k}^{f_{ref},s}$ --

Claim 19, Column 40, Line 25, "$\psi_{r,k}{}^{s} = \psi_{r,k}^{(\perp),s} + \psi_{r,k}^{(\|),s}$" should read -- $\psi_{r,k}^{s} = \psi_{r,k}^{(\perp),s} + \psi_{r,k}^{(\|),s}$ --

Claim 19, Column 40, Line 28, "$\psi_{r,k}{}^{(\perp),s}$" should read -- $\psi_{r,k}^{(\perp),s}$ --

Claim 19, Column 40, Line 30, "$\psi_{r,k}{}^{(\|),s}$" should read -- $\psi_{r,k}^{(\|),s}$ --

Claim 19, Column 40, Line 33, "$\zeta_{r,k}{}^{(\rho)f,s}$ and $\zeta_{r,k}{}^{(\varphi)f,s}$" should read -- $\zeta_{r,k}^{(\rho)f,s}$ and $\zeta_{r,k}^{(\varphi)f,s}$ --